(12) United States Patent
Chinn et al.

(10) Patent No.: US 11,178,847 B2
(45) Date of Patent: Nov. 23, 2021

(54) PET CARRIER FOR TRANSPORTING A PET IN A VEHICLE AND ASSOCIATED METHOD

(71) Applicant: The Boeing Company, Chicago, IL (US)

(72) Inventors: Laurie M. Chinn, Mukilteo, WA (US); Erin A. Hochschild, Seattle, WA (US); Sun Min Jung, Seattle, WA (US); Ionut Sava, Everett, WA (US)

(73) Assignee: The Boeing Company, Chicago, IL (US)

(*) Notice: Subject to any disclaimer, the term of this patent is extended or adjusted under 35 U.S.C. 154(b) by 837 days.

(21) Appl. No.: 15/982,225

(22) Filed: May 17, 2018

(65) Prior Publication Data

US 2019/0350163 A1 Nov. 21, 2019

(51) Int. Cl.
*A01K 1/02* (2006.01)
*B60R 22/10* (2006.01)
*B60R 21/02* (2006.01)

(52) U.S. Cl.
CPC .......... *A01K 1/0272* (2013.01); *A01K 1/0245* (2013.01); *B60R 21/02* (2013.01); *B60R 22/10* (2013.01)

(58) Field of Classification Search
CPC .. A01K 1/0272; A01K 1/0245; A01K 1/0254; A01K 1/0281; A01K 15/00; A01K 15/04; A01K 1/029; A01K 1/0353; A01K 27/002; B60R 22/10; B60R 21/02; B60R 11/00
USPC ................ 119/496, 771, 28.5, 497, 416, 453
See application file for complete search history.

(56) References Cited

U.S. PATENT DOCUMENTS

| | | | |
|---|---|---|---|
| 3,345,118 A | 10/1967 | Cummings | |
| 3,909,092 A | 9/1975 | Kiernan | |
| D329,944 S | 10/1992 | Longtin | |
| 5,277,148 A * | 1/1994 | Rossignol | A01K 1/029 119/453 |
| 5,421,476 A * | 6/1995 | Matias | B65D 90/048 220/1.5 |
| 5,657,896 A * | 8/1997 | Matias | B65D 90/048 220/1.6 |
| 5,718,191 A * | 2/1998 | O'Donnell | A01K 1/0281 119/771 |
| 6,015,198 A | 1/2000 | Stair | |

(Continued)

OTHER PUBLICATIONS

U.S. Appl. No. 15/627,505, filed Jun. 20, 2017.

*Primary Examiner* — Yvonne R Abbott-Lewis
(74) *Attorney, Agent, or Firm* — Kunzler Bean & Adamson

(57) ABSTRACT

Disclosed herein is a pet carrier for transporting a pet in a vehicle. The pet carrier includes a housing comprising a back wall, a front wall opposite the back wall, a first side wall, a second side wall opposite the first side wall, a top wall, a bottom wall opposite the top wall, and a door formed in at least one of the first side wall and the second side wall. At least one dimension of the housing is adjustable. The pet carrier also includes a wall reinforcement system. The wall reinforcement system includes at least one front reinforcement strap, coupled to and extending across the front wall, and side reinforcement straps each, coupled to and extending across corresponding ones of the first side wall and the second side wall. The at least one front reinforcement strap is coupled to the side reinforcement straps.

24 Claims, 15 Drawing Sheets

(56) References Cited

U.S. PATENT DOCUMENTS

| | | | | |
|---|---|---|---|---|
| 6,079,370 A * | 6/2000 | Al-Birmani | A01K 1/0245 | 119/771 |
| 6,571,740 B1 * | 6/2003 | Kinder | A01K 1/0245 | 119/416 |
| 6,588,365 B2 * | 7/2003 | Best Wright | A01K 1/0272 | 119/28.5 |
| 7,617,797 B2 * | 11/2009 | Lam | A45C 7/0054 | 119/497 |
| 8,056,511 B1 * | 11/2011 | Espinoza | A01K 1/0245 | 119/496 |
| 8,631,766 B2 * | 1/2014 | Frasier | B68C 1/20 | 119/496 |
| 9,150,163 B2 * | 10/2015 | Cronkright, II | B60R 11/02 | |
| 9,849,838 B1 * | 12/2017 | Siciliano | B65D 25/00 | |
| 10,486,641 B2 * | 11/2019 | Koop | A01K 15/00 | |
| 2003/0127060 A1 * | 7/2003 | Yeung | A01K 1/0254 | 119/497 |
| 2005/0279750 A1 | 12/2005 | Barquist et al. | | |
| 2006/0213452 A1 * | 9/2006 | King | A01K 1/0254 | 119/496 |
| 2006/0278173 A1 * | 12/2006 | Kamijo | B60R 7/043 | 119/496 |
| 2007/0228097 A1 | 10/2007 | Recanati | | |
| 2008/0011234 A1 * | 1/2008 | Wilkes | A01K 1/0272 | 119/28.5 |
| 2008/0245311 A1 * | 10/2008 | Kline | A01K 1/0272 | 119/496 |
| 2009/0078713 A1 * | 3/2009 | Quick | B65D 33/14 | 220/694 |
| 2009/0199770 A1 * | 8/2009 | Jakubowski | A01K 1/0272 | 119/28.5 |
| 2009/0314219 A1 * | 12/2009 | Bryson | A01K 1/0254 | 119/496 |
| 2010/0139573 A1 * | 6/2010 | Wilson | A01K 1/0254 | 119/496 |

* cited by examiner

PET CARRIER FOR TRANSPORTING A PET IN A VEHICLE AND ASSOCIATED METHOD

FIELD

This disclosure relates to the transportation of pets, and more particularly to pet carriers for transporting pets on seats of vehicles, such as mass-transit vehicles.

BACKGROUND

Transporting pets, such as larger pets weighing over twenty pounds, on some mass-transit vehicles can be difficult. Although pet carriers for larger pets exist, such pet carriers are not configured for stowage in a passenger compartment of a vehicle. Accordingly, such pets are traditionally transported as cargo and located in a cargo compartment of the vehicle away from owners seated in the passenger compartment.

SUMMARY

The subject matter of the present application has been developed in response to the present state of the art, and in particular, in response to the shortcomings of pet carriers that have not yet been fully solved by currently available techniques. Accordingly, the subject matter of the present application has been developed to provide a pet carrier that is configured for stowage in a passenger compartment of a vehicle so as to overcome at least some of the above-discussed shortcomings of prior art techniques.

Disclosed herein is a pet carrier for transporting a pet in a vehicle. The pet carrier comprises a housing comprising a back wall, a front wall opposite the back wall, a first side wall, a second side wall opposite the first side wall, a top wall, a bottom wall opposite the top wall, and a door formed in at least one of the first side wall and the second side wall. At least one dimension of the housing is adjustable. The pet carrier also comprises a wall reinforcement system. The wall reinforcement system comprises at least one front reinforcement strap, coupled to and extending across the front wall, and side reinforcement straps each, coupled to and extending across corresponding ones of the first side wall and the second side wall. The at least one front reinforcement strap is coupled to the side reinforcement straps. The preceding subject matter of this paragraph characterizes example 1 of the present disclosure.

The pet carrier further comprises seat belt extenders. The seat belt extenders each comprises an extension strap coupled to a corresponding one of the side reinforcement straps and a mechanical coupler coupled to the extension strap. The mechanical coupler is configured to be releasably coupled to a seat belt of the vehicle. The preceding subject matter of this paragraph characterizes example 2 of the present disclosure, wherein example 2 also includes the subject matter according to example 1, above.

The wall reinforcement system comprises two front reinforcement straps coupled to and extending across the front wall. The two front reinforcement straps are spaced apart from each other. The wall reinforcement system also comprises two side reinforcement straps both coupled to and extending across corresponding ones of the first side wall and the second side wall. The two side reinforcement straps corresponding with each of the first side wall and the second side wall are spaced apart from each other. Each of the two side reinforcement straps corresponding with each of the first side wall and the second side wall is coupled to a corresponding one of the two front reinforcement straps. The extension strap of each seat belt extender is coupled to the two side reinforcement straps corresponding with a respective one of the first side wall and the second side wall. The preceding subject matter of this paragraph characterizes example 3 of the present disclosure, wherein example 3 also includes the subject matter according to example 2, above.

The at least one front reinforcement strap, the side reinforcement straps, and the extension strap of each one of the seat belt extenders comprises webbing made of synthetic or natural fibers. The preceding subject matter of this paragraph characterizes example 4 of the present disclosure, wherein example 4 also includes the subject matter according to any one of examples 2-3, above.

The wall reinforcement system comprises a plurality of front reinforcement straps interconnected together at the front wall. The preceding subject matter of this paragraph characterizes example 5 of the present disclosure, wherein example 5 also includes the subject matter according to any one of examples 1-4, above.

The plurality of front reinforcement straps form a netting. The preceding subject matter of this paragraph characterizes example 6 of the present disclosure, wherein example 6 also includes the subject matter according to any one of examples 4-5, above.

The at least one front reinforcement strap is seamlessly coupled to the side reinforcement straps. The preceding subject matter of this paragraph characterizes example 7 of the present disclosure, wherein example 7 also includes the subject matter according to any one of examples 1-6, above.

At least one of an angle defined between the front wall and the bottom wall is acute and an angle defined between the back wall and the top wall is acute. The preceding subject matter of this paragraph characterizes example 8 of the present disclosure, wherein example 8 also includes the subject matter according to any one of examples 1-7, above.

Both the angle defined between the front wall and the bottom wall is acute and the angle defined between the back wall and the top wall is acute. The preceding subject matter of this paragraph characterizes example 9 of the present disclosure, wherein example 9 also includes the subject matter according to example 8, above.

A cross-sectional shape of the housing, defined along a plane perpendicular to the back wall and the front wall is a non-rectangular parallelogram. The preceding subject matter of this paragraph characterizes example 10 of the present disclosure, wherein example 10 also includes the subject matter according to any one of examples 1-9, above.

Each of the back wall, the front wall, the first side wall, the second side wall, and the top wall comprises a flexible fabric. The preceding subject matter of this paragraph characterizes example 11 of the present disclosure, wherein example 11 also includes the subject matter according to any one of examples 1-10, above.

The bottom wall comprises a rigid shell. The preceding subject matter of this paragraph characterizes example 12 of the present disclosure, wherein example 12 also includes the subject matter according to example 11, above.

The pet carrier further comprises retractable wheels coupled to the bottom wall. The preceding subject matter of this paragraph characterizes example 13 of the present disclosure, wherein example 13 also includes the subject matter according to any one of examples 1-12, above.

The pet carrier further comprises a retractable stand coupled to the housing. The retractable stand is selectively adjustable to extend from the bottom wall in a direction perpendicular to the bottom wall and away from the top wall. The preceding subject matter of this paragraph characterizes example 14 of the present disclosure, wherein example 14 also includes the subject matter according to any one of examples 1-13, above.

The at least one dimension of the housing comprises a distance between the front wall and the back wall. The preceding subject matter of this paragraph characterizes example 15 of the present disclosure, wherein example 15 also includes the subject matter according to any one of examples 1-14, above.

The housing further comprises at least one telescoping feature selectively operable to adjust the distance between the front wall and the back wall. The preceding subject matter of this paragraph characterizes example 16 of the present disclosure, wherein example 16 also includes the subject matter according to any one of examples 14-15, above.

The at least one dimension of the housing further comprises a distance between the top wall and the bottom wall. The preceding subject matter of this paragraph characterizes example 17 of the present disclosure, wherein example 17 also includes the subject matter according to any one of examples 14-16, above.

The wall reinforcement system further comprises at least one top reinforcement strap coupled to and extending across the top wall. The preceding subject matter of this paragraph characterizes example 18 of the present disclosure, wherein example 18 also includes the subject matter according to any one of examples 1-17, above.

The housing further comprises a seat belt retention slot configured to releasably retain at least one of two seat belt straps of a seat belt of the vehicle. The pet carrier further comprises hubs each coupled to a corresponding one of the side reinforcement straps and each configured to be releasably coupled to a corresponding one of the two seat belt straps. The preceding subject matter of this paragraph characterizes example 19 of the present disclosure, wherein example 19 also includes the subject matter according to any one of examples 1-18, above.

Further disclosed herein is a pet carrier for transporting a pet in a vehicle. The vehicle comprises at least two seats in tandem, such that a space is defined between the at least two seats, and a floor on which the at least two seats are supported. Each seat comprises a seat back, a seat bottom, and a seat belt. An acute angle is defined between the seat back and the floor. The pet carrier comprises a housing comprising a back wall, a front wall opposite the back wall, a first side wall, a second side wall opposite the first side wall, a top wall, and a bottom wall opposite the top wall. An angle defined between the front wall and the bottom wall is equal to the acute angle defined between the seat back and the floor. An angle defined between the back wall and the top wall is equal to the acute angle defined between the seat back and the floor. The pet carrier also comprises a wall reinforcement system. The wall reinforcement system comprises at least one front reinforcement strap coupled to and extending across the front wall. The wall reinforcement system also comprises side reinforcement straps each coupled to and extending across corresponding ones of the first side wall and the second side wall. The at least one front reinforcement strap is coupled to the side reinforcement straps. The pet carrier further comprises seat belt extenders each comprising an extension strap coupled to a corresponding one of the side reinforcement straps and a mechanical coupler coupled to the extension strap. The mechanical coupler is configured to be releasably coupled to the seat belt of a corresponding one of the seats of the vehicle. The preceding subject matter of this paragraph characterizes example 20 of the present disclosure.

The pet carrier further comprises a retractable stand coupled to the housing. The retractable stand is selectively adjustable to extend from the bottom wall in a direction perpendicular to the bottom wall and away from the top wall. The housing is positionable within the space defined between the at least two seats and supportable on the seat bottom of a rearward one of the at least two seats. When the housing is supported on the seat bottom, the retractable stand, when extended, is supported on the floor of the vehicle. The preceding subject matter of this paragraph characterizes example 21 of the present disclosure, wherein example 21 also includes the subject matter according to example 20, above.

The front wall comprises a flexible fabric. The front wall and the at least one front reinforcement strap together withstand inertial forces of at least nine times the force of gravity. The preceding subject matter of this paragraph characterizes example 22 of the present disclosure, wherein example 22 also includes the subject matter according to any one of examples 20-21, above.

Additionally disclosed herein is a pet carrier for transporting a pet in a vehicle. The pet carrier comprises a housing. The pet carrier also comprises a retractable stand coupled to the housing. The pet carrier further comprises retractable wheels coupled to the housing. The pet carrier is operable in a storage mode in which the housing of the pet carrier is at least partially collapsed, the retractable wheels of the pet carrier are retracted, and the retractable stand of the pet carrier is retracted. The pet carrier is also operable in a pet transport mode in which the housing of the pet carrier is fully expanded, the retractable wheels of the pet carrier are extended, and the retractable stand of the pet carrier is retracted. The pet carrier is further operable in an aisle traversal mode in which the pet carrier has a smaller width than in the pet transport mode, the retractable wheels of the pet carrier are extended, and the retractable stand of the pet carrier is retracted. The pet carrier is additionally operable in a pet stowage mode in which the pet carrier has a width greater than in the aisle traversal mode, the retractable wheels of the pet carrier are retracted, and the retractable stand of the pet carrier is extended. The preceding subject matter of this paragraph characterizes example 23 of the present disclosure.

Also disclosed herein is a method of transporting a pet carrier. The method comprises converting the pet carrier from a storage mode, in which a housing of the pet carrier is at least partially collapsed and a retractable stand of the pet carrier is retracted, to a pet transport mode, in which the housing of the pet carrier is fully expanded, retractable wheels of the pet carrier are extended, and the retractable stand of the pet carrier is retracted. The method also comprises converting the pet carrier from the pet transport mode to an aisle traversal mode, in which the pet carrier has a smaller width than in the pet transport mode, the retractable wheels of the pet carrier are extended, and the retractable stand of the pet carrier is retracted. The method further comprises converting the pet carrier from the aisle traversal mode to a pet stowage mode, in which the pet carrier has a width greater than in the aisle traversal mode, the retractable wheels of the pet carrier are retracted, and the retractable stand of the pet carrier is extended. The preceding subject matter of this paragraph characterizes example 24 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The pet carrier of the present disclosure facilitates the transportation of a pet on a vehicle. In particular, the pet carrier promotes transportation of the pet along an aisle of the vehicle, between seats of the vehicle, in one example, and promotes secure transportation of the pet on a seat of the vehicle while the vehicle is in motion. In one implementation, the pet carrier has an adjustable width to allow the pet carrier to fit in the aisle between the seats. According to one implementation, the pet carrier has a wall reinforcement system that promotes resistance to inertial forces and seat belt extenders that allow the pet carrier to be restrained on a seat by a built-in seat belt of the vehicle.

Figure 1:
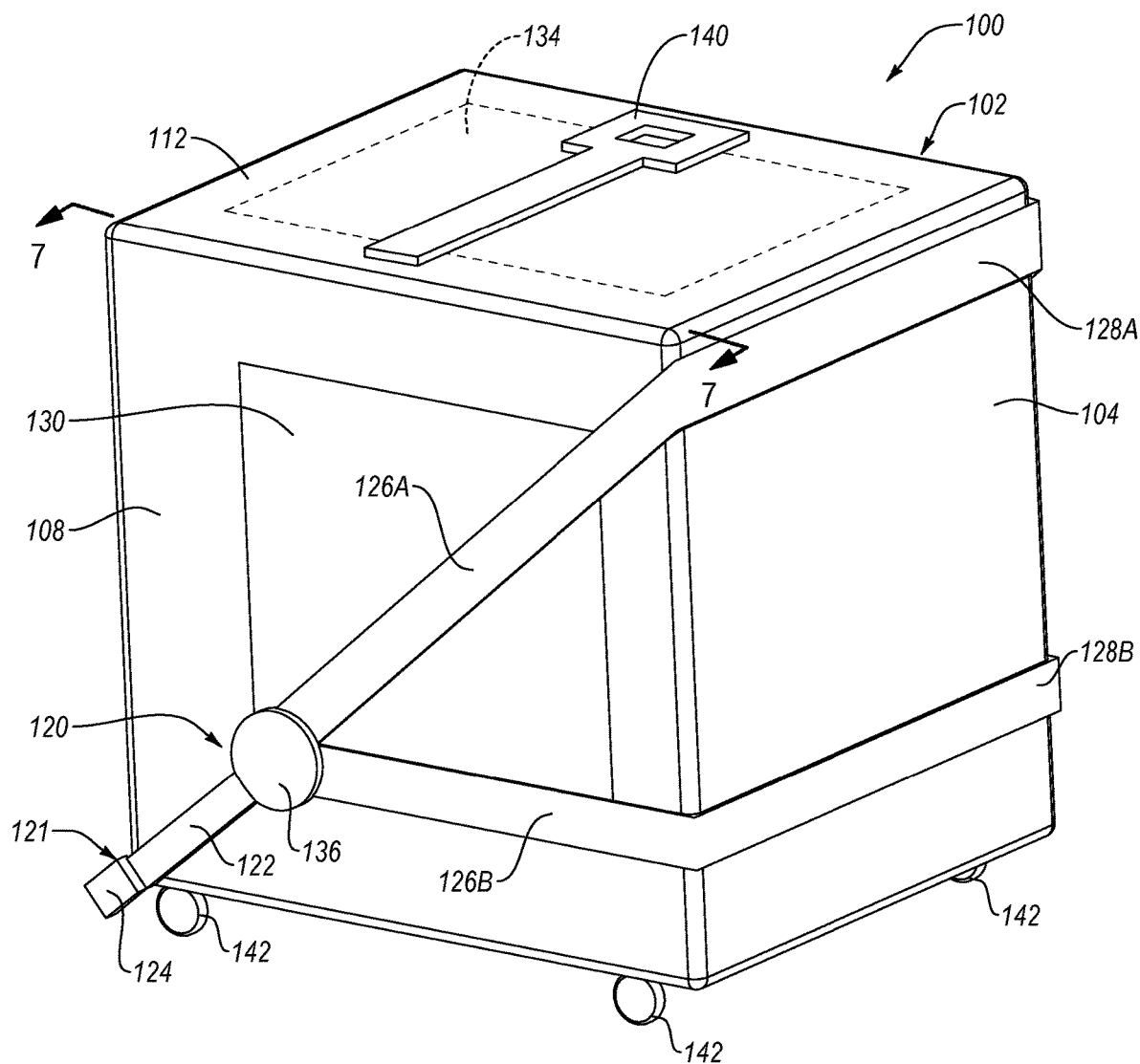
FIG. 1 is a perspective view of a first side of a pet carrier, according to one or more examples of the present disclosure.
Figure 2:
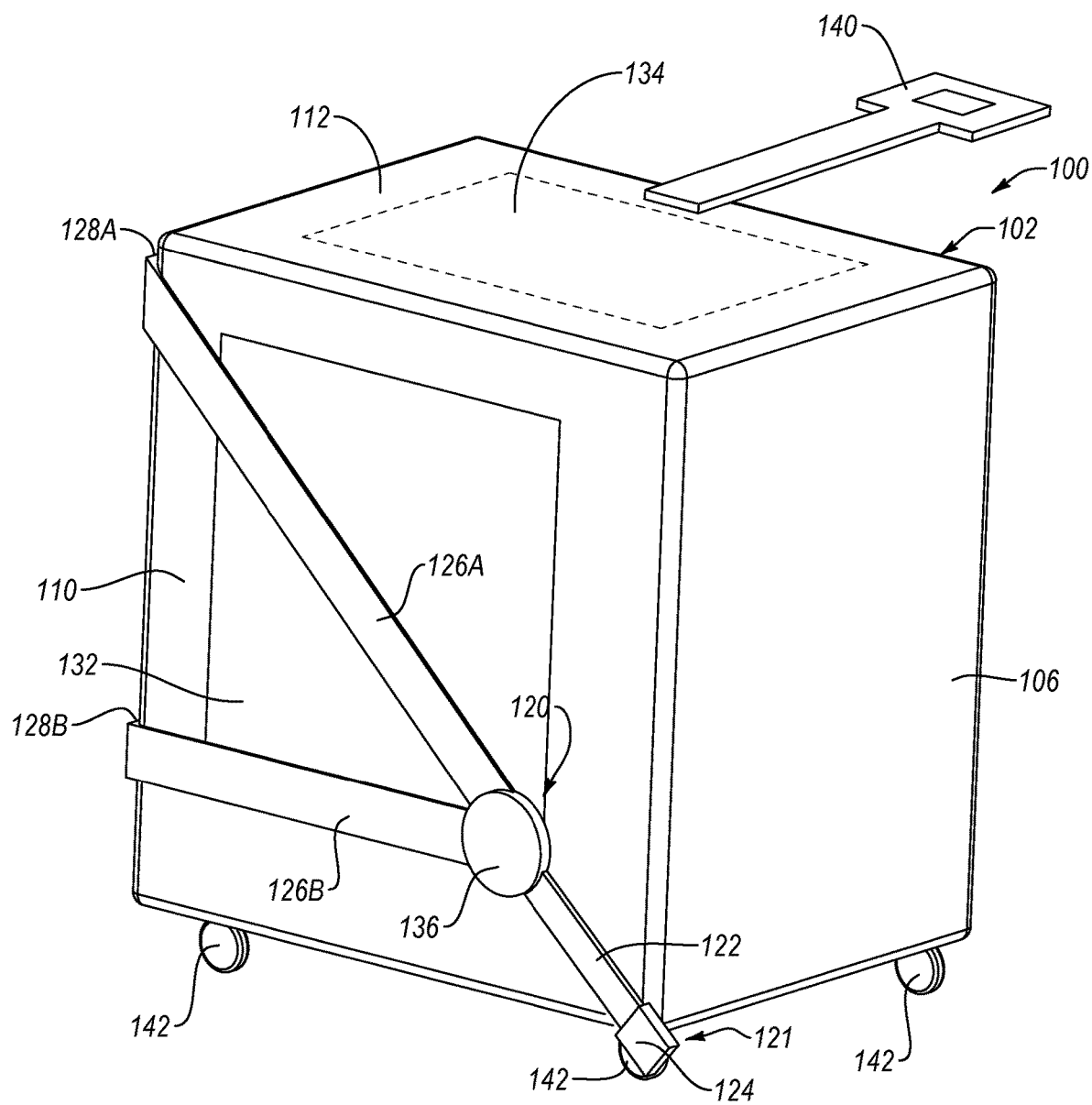
FIG. 2 is a perspective view of a second side of the pet carrier of FIG. 1, according to one or more examples of the present disclosure.

Referring to FIGS. 1 and 2, one embodiment of a pet carrier 100 is shown. The pet carrier 100 is configured to transport a pet in a vehicle, such as the vehicle 200 of FIG. 6. The pet carrier 100 includes a housing 102, a wall reinforcement system 120, and seat belt extenders 121. The housing 102 includes a back wall 106, a front wall 104, a first side wall 108, a second side wall 110, a top wall 112, and a bottom wall 114. The front wall 104 is opposite the back wall 106. For example, the front wall 104 and the back wall 106 can be parallel to each other. The second side wall 110 is opposite the first side wall 108. For example, the second side wall 110 and the first side wall 108 can be parallel to each other. The bottom wall 114 is opposite the top wall 112. For example, the second side wall 110 can be parallel to the top wall 112. In some implementations, the first side wall 108 and the second side wall 110 are perpendicular to the back wall 106, the front wall 104, the top wall 112, and the bottom wall 114. The back wall 106, the front wall 104, the first side wall 108, the second side wall 110, the top wall 112, and the bottom wall 114 collectively define an interior cavity 160 of the housing 102. When transported, the pet is located within the interior cavity 160 of the housing 102. Accordingly, the housing 102 is sized such that the interior cavity 160 is large enough to comfortably retain a pet (e.g., allow the pet to sit, lie down, and turn around) within the interior cavity 160.

Figure 5:
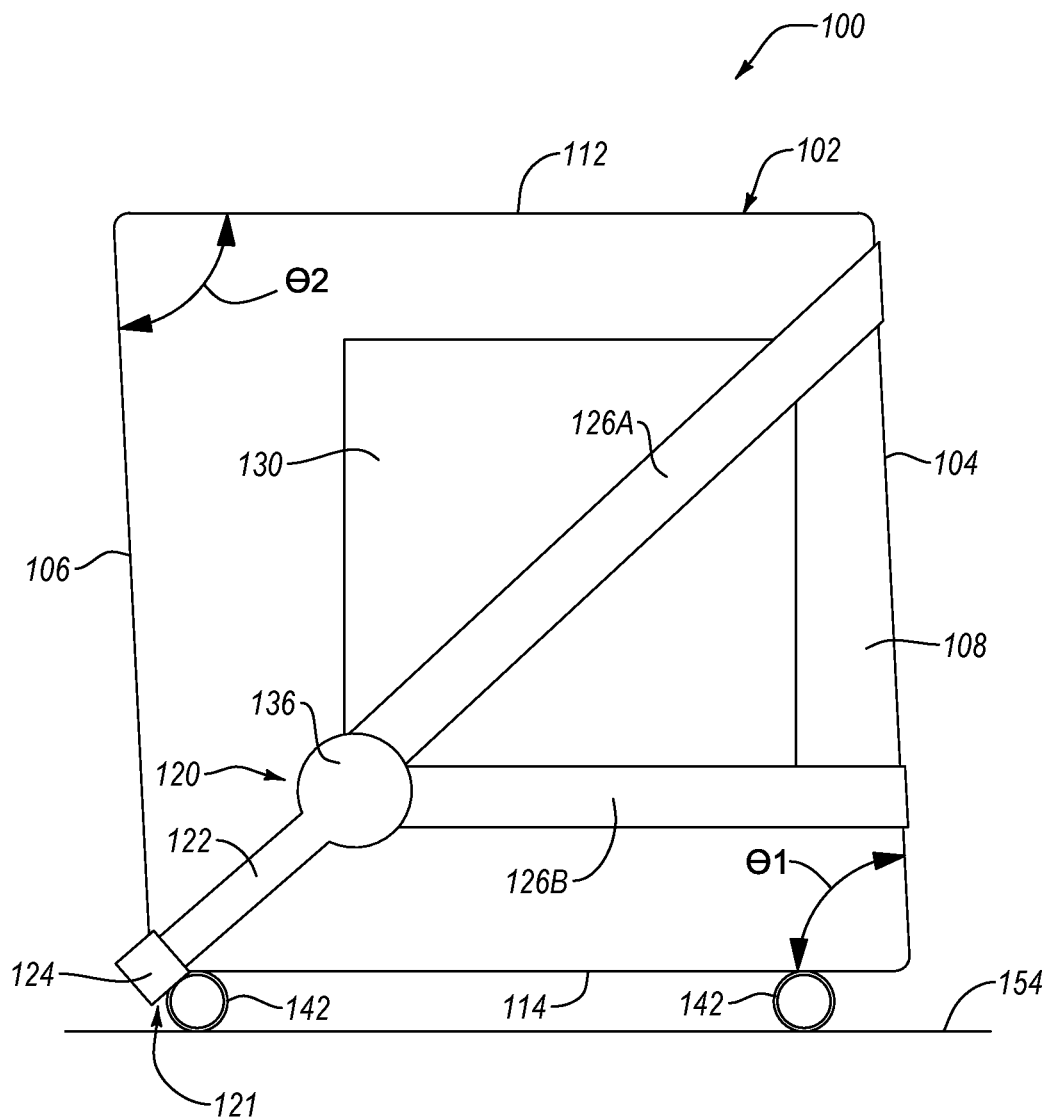
FIG. 5 is a side elevation view of the pet carrier of FIG. 1, according to one or more examples of the present disclosure.

Referring to FIG. 5, a first angle θ1 defined between the front wall 104 and the bottom wall 114 is acute (i.e., less than 90-degrees) and a second angle θ2 defined between the back wall 106 and the top wall 112 is acute. Accordingly, in some implementations, a cross-sectional shape of the housing 102, defined along a plane perpendicular to the back wall 106 and the front wall 104 is a non-rectangular parallelogram. However, in other implementations, only one or neither of the first angle θ1 and the second angle θ2 is acute.

Figure 7:
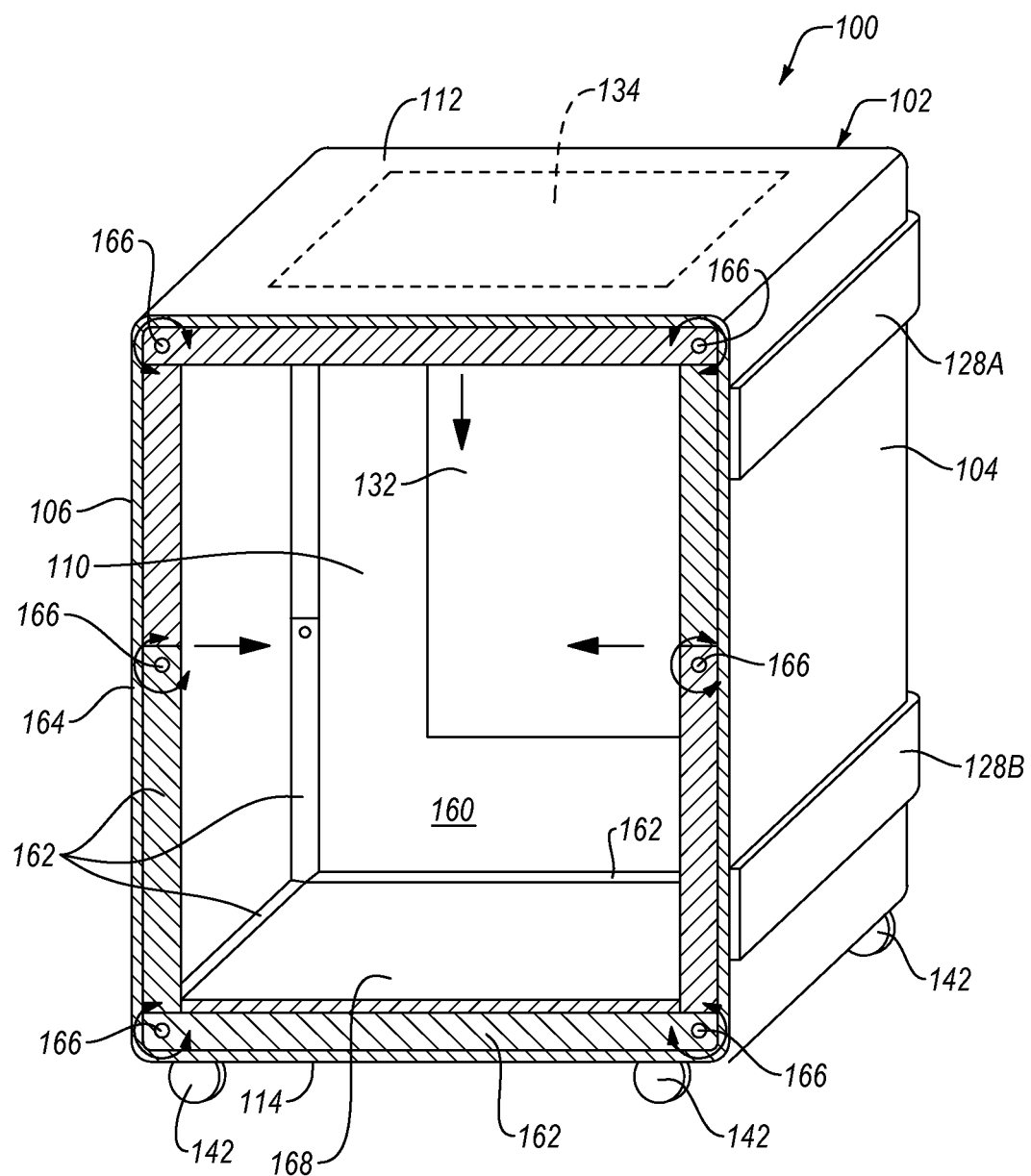
FIG. 7 is a cross-sectional perspective view of the pet carrier of FIG. 1, taken along the line 7-7 of FIG. 1, according to one or more examples of the present disclosure.
Figure 8:
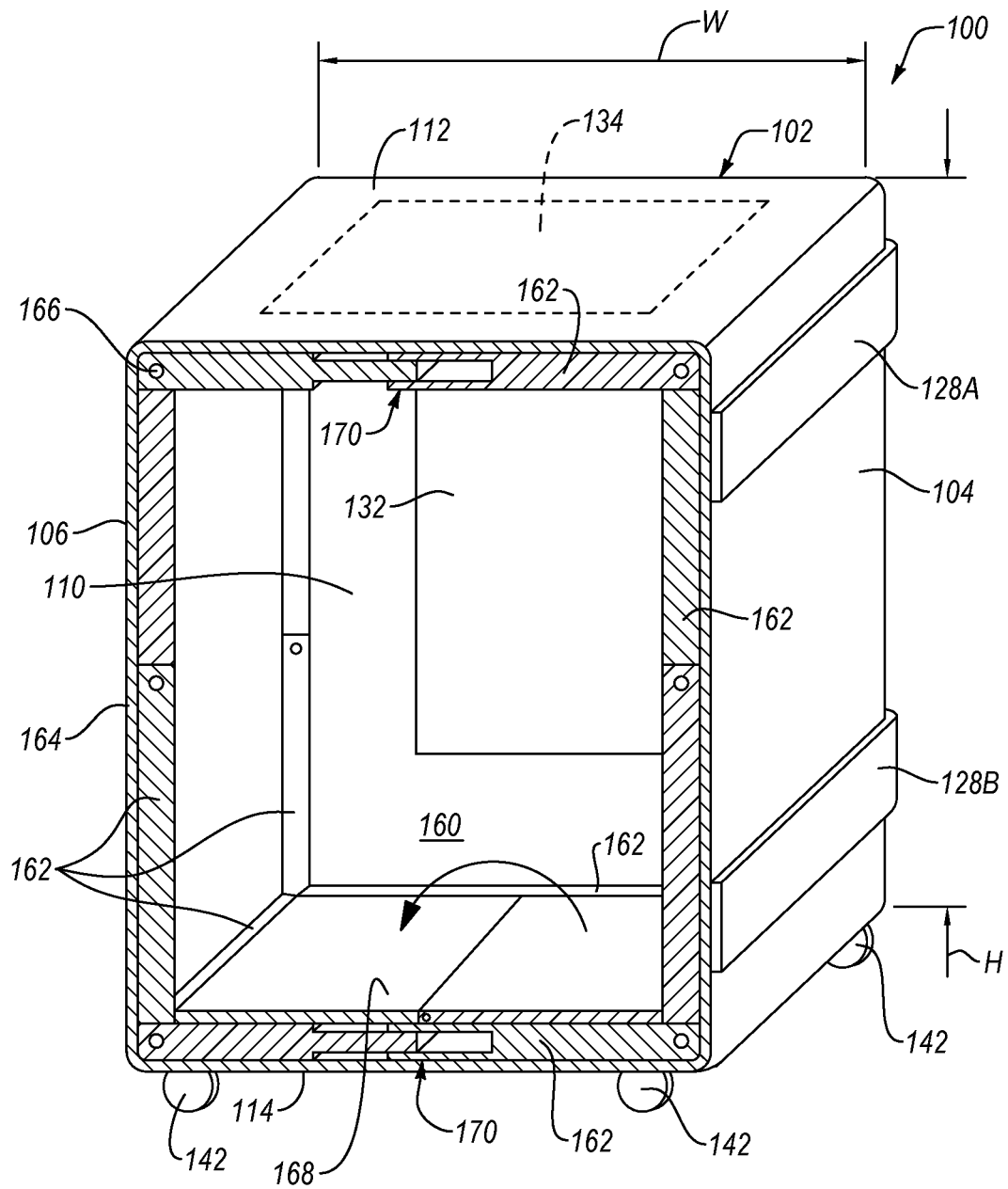
FIG. 8 is a cross-sectional perspective view of the pet carrier of FIG. 1, taken along the line 7-7 of FIG. 1, according to one or more examples of the present disclosure.

According to some implementations, at least one of the back wall 106, the front wall 104, the first side wall 108, the second side wall 110, the top wall 112, and the bottom wall 114 is made of a flexible fabric 164 (see, e.g., FIG. 7). The flexible fabric 164 is a breathable fabric, such as a nylon mesh or mesh made of another type of fiber. The flexible fabric 164 can be coated with a coating, such as a protective coating (e.g., a polyvinyl chloride (PVC) coating). In one implementation, all of the back wall 106, the front wall 104, the first side wall 108, the second side wall 110, the top wall 112, and the bottom wall 114 are made of the flexible fabric 164. In such an implementation, as shown in FIG. 8, the bottom wall 114 may further include a rigid shell 168 positioned within the interior cavity 160 on the flexible fabric 164 of the bottom wall 114 to act as a hard-shell bottom of the housing 102 for supporting the weight of a pet inside the housing 102. According to one implementation, the back wall 106, the front wall 104, the first side wall 108, the second side wall 110, and the top wall 112 are made of the flexible fabric 164 and the bottom wall 114 is made of a rigid material, such as a hardened plastic. In some examples, the bottom wall 114 is contoured to match a contour of a seat on a vehicle so as to promote a secure seated engagement with the seat.

Figure 3:
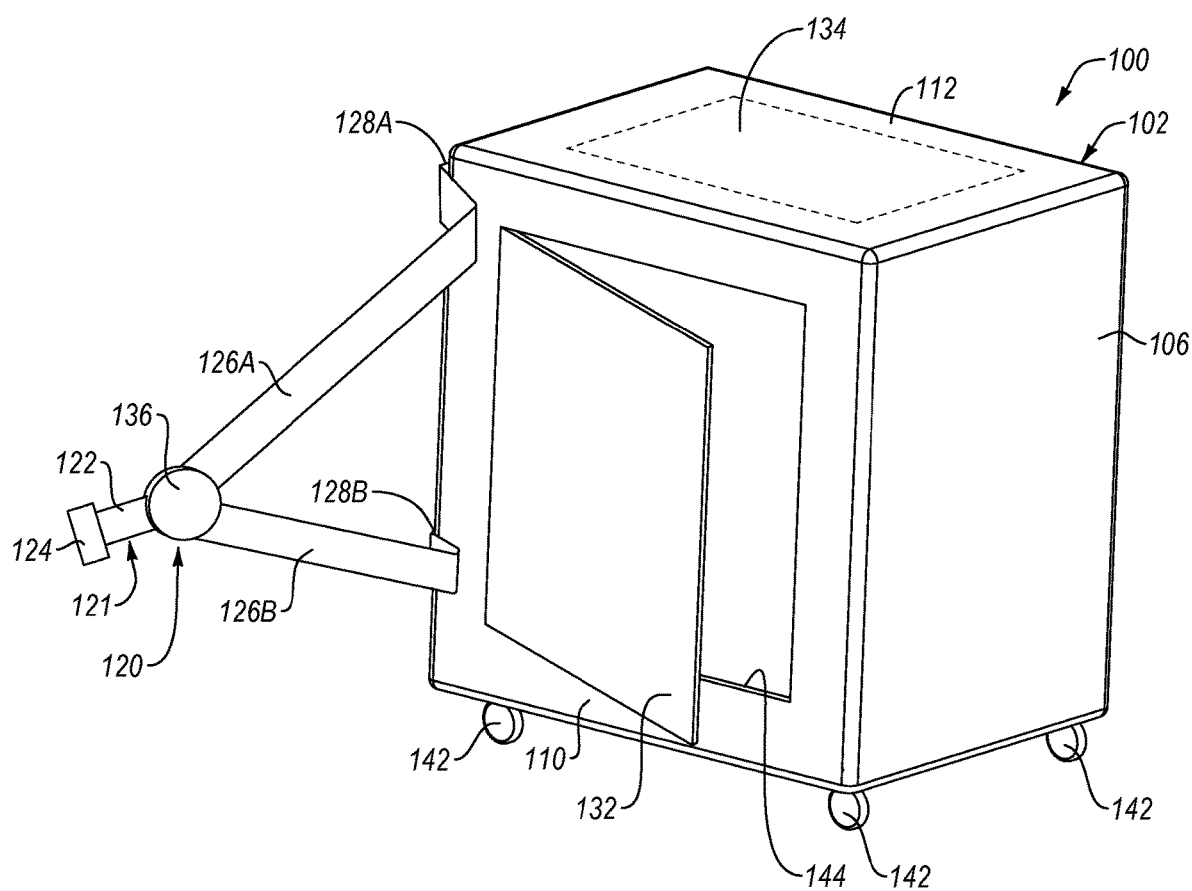
FIG. 3 is a perspective view of the second side of the pet carrier of FIG. 1, shown with side reinforcement straps moved away from a side wall, according to one or more examples of the present disclosure.

The housing 102 includes a door formed in at least one of the first side wall 108 and the second side wall 110. In the illustrated example, the housing 102 includes a door 130 formed in the first side wall 108 and a door 132 formed in the second side wall 110. However, in other examples, only one of the first side wall 108 or the second side wall 110 includes a door. Optionally, the housing 102 may include a door 134 formed in the top wall 112. Referring to FIG. 3, the door 132 is openable to allow access to the interior cavity 160 via an access opening 144 formed in the second side wall 110. The door 130 and the door 134 can be configured similarly to the door 132. One or more of the door 130, the door 134, and the door 134 can be rigid or flexible. In one example, one or more of the door 130, the door 134, and the door 134 can be made of the same or similar flexible material as the corresponding one of the first side wall 108, the second side wall 110, and the top wall 112. In some implementations, the doors can be transparent and/or breathable. Moreover, in certain implementations, each door may include multiple separable layers, such as a transparent layer and a non-transparent layer.

The housing 102 further includes a frame 162 to which the back wall 106, the front wall 104, the first side wall 108, the second side wall 110, the top wall 112, and the bottom wall 114 is coupled. In one example, the back wall 106, the front wall 104, the first side wall 108, the second side wall 110, the top wall 112, and the bottom wall 114 overlay the frame 162, such that the frame 162 acts as an internal frame. In another example, the back wall 106, the front wall 104, the first side wall 108, the second side wall 110, the top wall 112, and the bottom wall 114 underlay the frame 162, such that the frame 162 acts as an external frame. The frame 162 is made of one or more rigid members. In one example, the frame 162 has a monolithic, one-piece unitary construction. However, in another example, such as shown, the frame 162 is made of a plurality of interconnected elongated rigid members, such as poles.

At least one dimension of the housing 102 is adjustable according to one embodiment. In some examples, only one dimension of the housing 102, such as a width W of the housing 102 (see, e.g., FIGS. 8 and 9), is adjustable. However, in other examples, multiple dimensions of the housing 102 (e.g., the width W and a height H of the housing 102) are adjustable. The width W is defined as the distance between the front wall 104 and the back wall 106. The height H is defined as the distance between the top wall 112 and the bottom wall 114. Because at least one dimension of the housing 102 is adjustable, the housing 102 is considered at least partially collapsible.

Referring to FIG. 7, in one example, the housing 102 can be fully collapsible. The frame 162 may include a plurality of interconnected elongated rigid members pivotally coupled together at pivot points 166. The rigid members may pivot relative to adjacent rigid members to allow the first side wall 108 and the second side wall 110 to fold inwardly, into the interior cavity 160 as indicated by directional arrows, which results in the top wall 112 moving towards the bottom wall 114, as also indicated by directional arrows, and a corresponding reduction of the height H of the housing 102. The housing 102 can be considered fully collapsed when the top wall 112 is just adjacent or pressed against the bottom wall 114.

Figure 9:
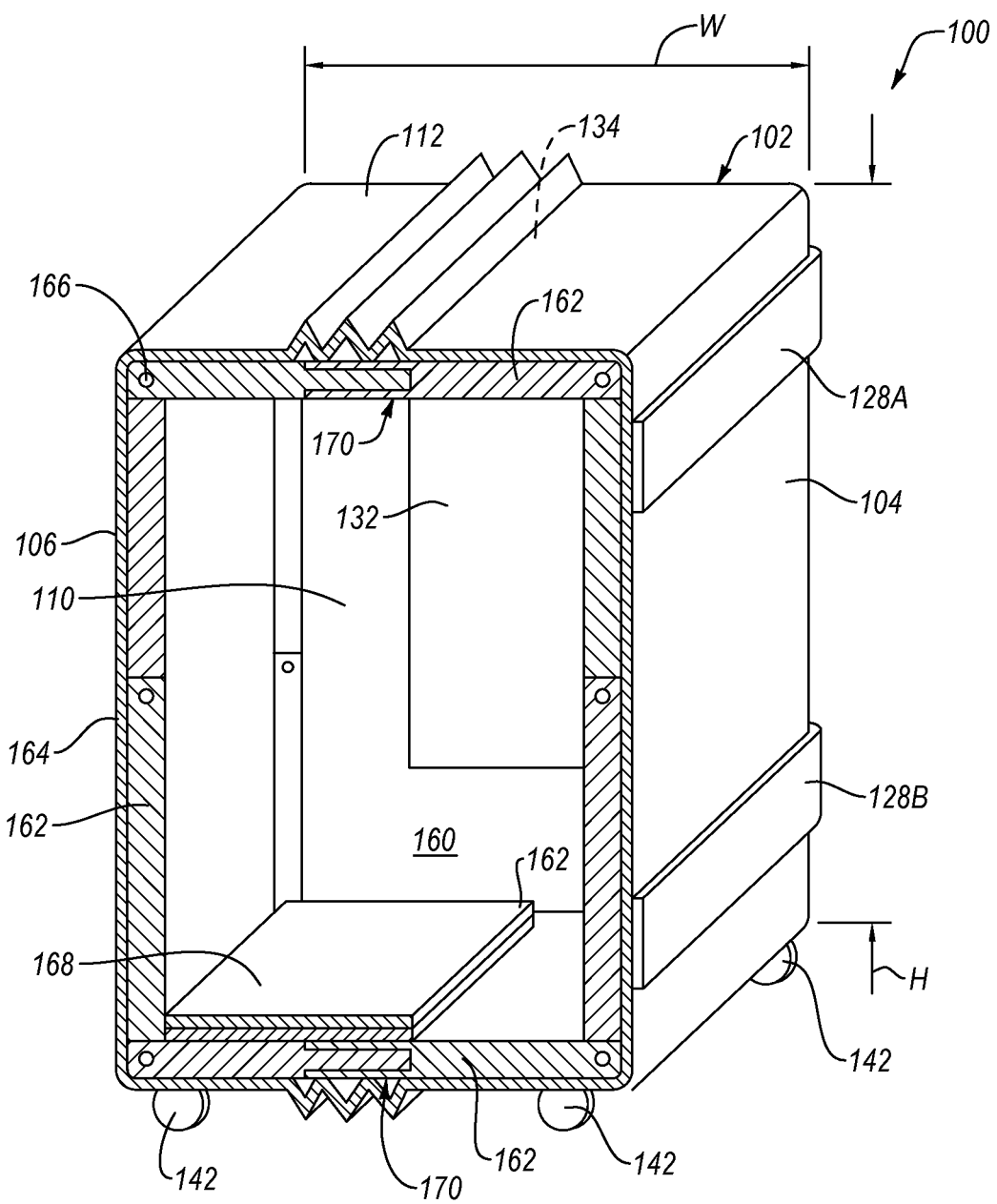
FIG. 9 is a cross-sectional perspective view of the pet carrier of FIG. 1, taken along the line 7-7 of FIG. 1, according to one or more examples of the present disclosure.
Figure 10:
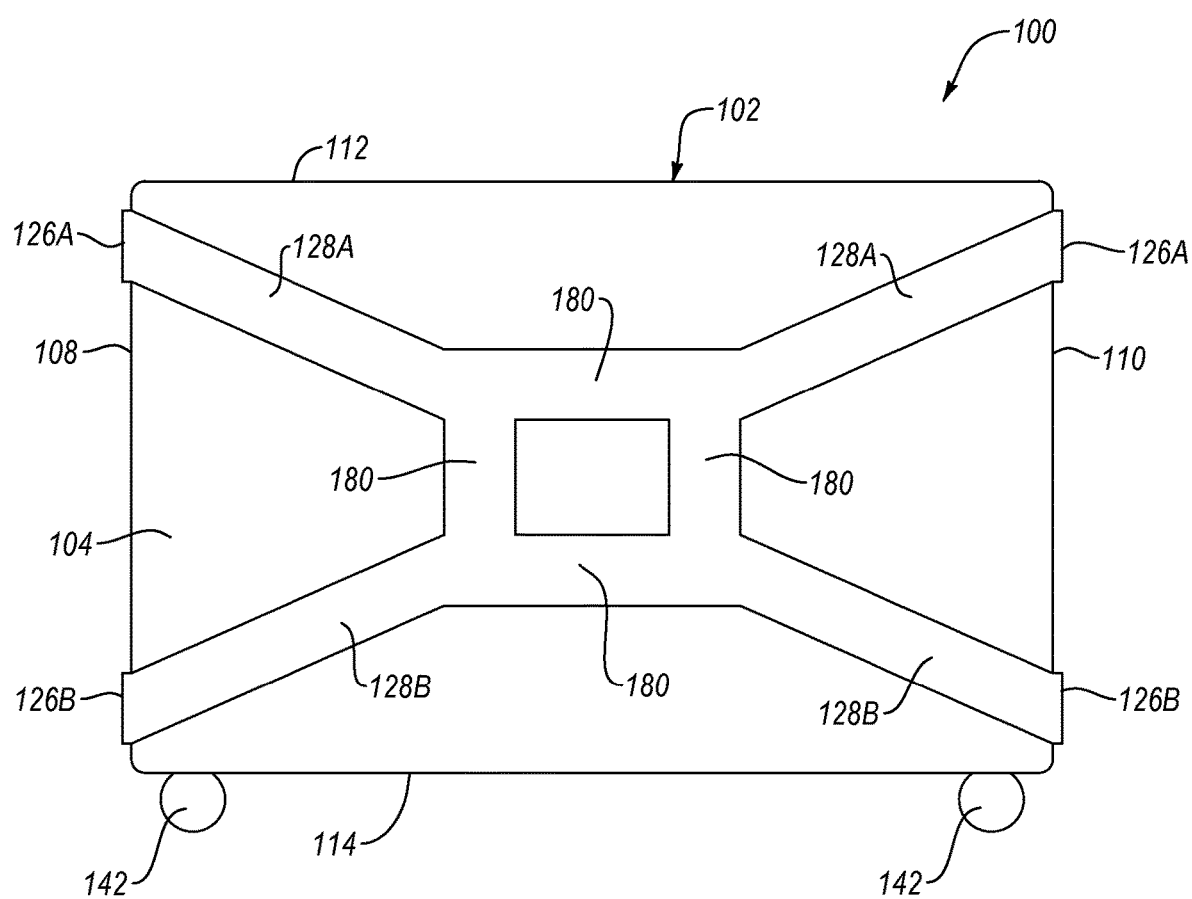
FIG. 10 is a front view of a pet carrier, according to one or more examples of the present disclosure.
Figure 11:
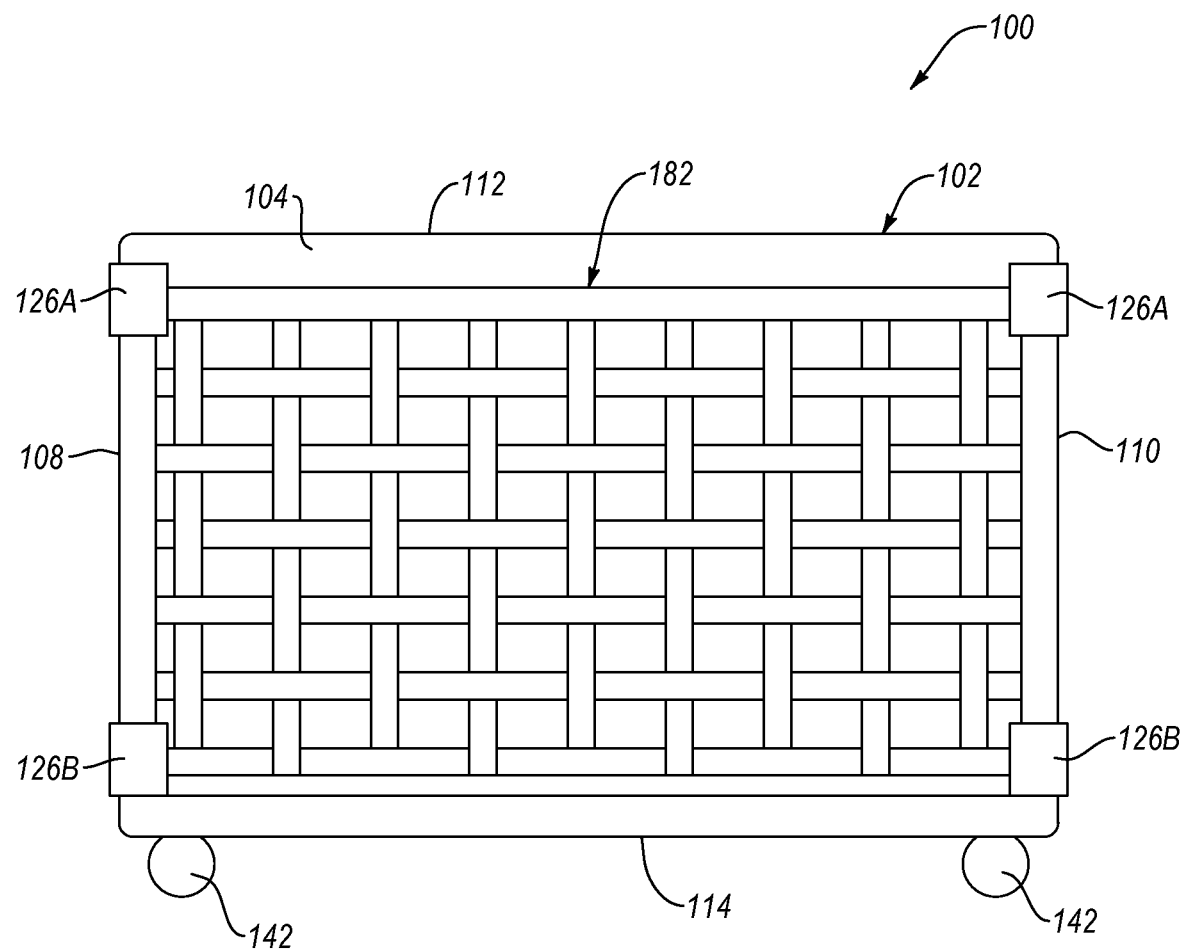
FIG. 11 is a front view of a pet carrier, according to one or more examples of the present disclosure.
Figure 12:
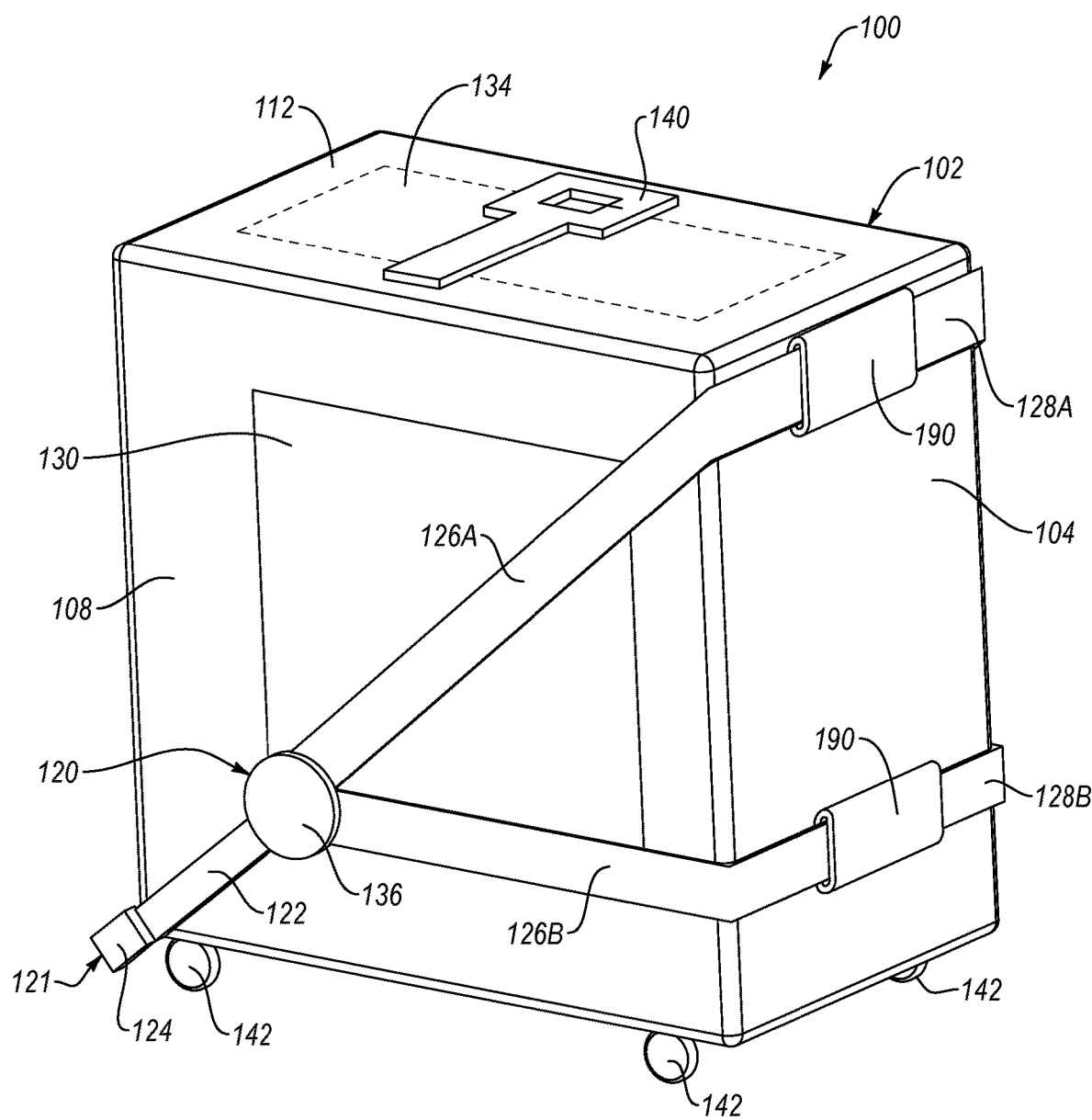
FIG. 12, is a perspective view of a first side of a pet carrier, according to one or more examples of the present disclosure.

Referring to FIGS. 8 and 9, in one example, the housing 102 is additionally or alternatively partially collapsible by adjusting the width W of the housing 102. The width W is adjustable by moving the front wall 104 and the back wall 106 relative to each other. Relative movement of the front wall 104 and the back wall 106 is facilitated by an adjustment mechanism that is selectively operable to adjust the distance between the front wall 104 and the back wall 106. In the illustrated example, the adjustment mechanism is at least one telescoping feature 170 built or integrated into the frame 162. In particular, the adjustment mechanism can include a telescoping feature 170 integrated into cross-members of the frame 162 extending between the front wall 104 and the back wall 106. Each telescoping feature 170 includes a piston movable within a cylinder. The piston can be formed in one end of a cross-member portion of the frame 162 and the cylinder can be formed in the end of the other cross-member portion. Accordingly, to decrease the width W, the piston of the telescoping feature 170 can be moved along the cylinder of the telescoping feature 170, as indicated by directional arrow in FIG. 8. The telescoping feature 170 may be releasably lockable, such as a detent mechanism or spring-loaded locking pin mechanism, to releasably lock the cross-member in an extended or lengthened position (see, e.g., FIG. 8) or a retracted or shortened position (see, e.g., FIG. 9). As the width W is decreased, the flexible fabric 164 of the top wall 112 and the bottom wall 114 may be drawn together or scrunched as shown in FIG. 9.

In some implementations, the rigid shell 168 may also include one or more adjustment mechanisms to facilitate an adjustment to the width of the rigid shell 168 corresponding to the adjustment of the width W of the housing 102. For example, referring to FIGS. 8 and 9, the rigid shell 168 include foldable or stackable sections that when folded or stacked in effect reduces the width of the rigid shell 168 to allow for the reduction in the width W of the housing 102. Additionally or alternatively, the rigid shell 168 can include adjustment mechanisms similar to the telescoping feature 170.

Referring back to FIGS. 1 and 2, the pet carrier 100 further includes a handle 140 coupled to the housing 102. In one example, the handle 140 is retractably (e.g., pivotally) coupled to the housing 102 and configured to be extendable (for gripping by a user), as shown in FIG. 2, and retractable against or into the housing 102, as shown in FIG. 1. According to an example, the handle 140 is coupled to the top wall 112 of the housing 102. The handle 140 helps facilitate lifting and pulling the pet carrier 100.

The pet carrier 100 also includes retractable wheels 142 coupled to the bottom wall 114 of the housing 102 or coupled to the housing 102 at least near the bottom wall 114 of the housing 102. The retractable wheels 142 are configured to be extendable into an extended position away from the bottom wall 114 (see, e.g., FIGS. 1-3, 5, and 7-12) and retractable into a retracted position at least partially within the bottom wall 114 (see, e.g., FIGS. 4 and 6). The retractable wheels 142 may be extended and retracted via actuation of a retraction mechanism, such as selectively lockable pins, levers, detent mechanism, and the like. When extended, the retractable wheels 142 promote rolling engagement with a floor 154 or ground surface. In contrast, when retracted, the retractable wheels 142 are in effect embedded within the housing so as not to interfere with the seated engagement between the housing 102 and a seat on which the housing 102 is supported.

Figure 4:
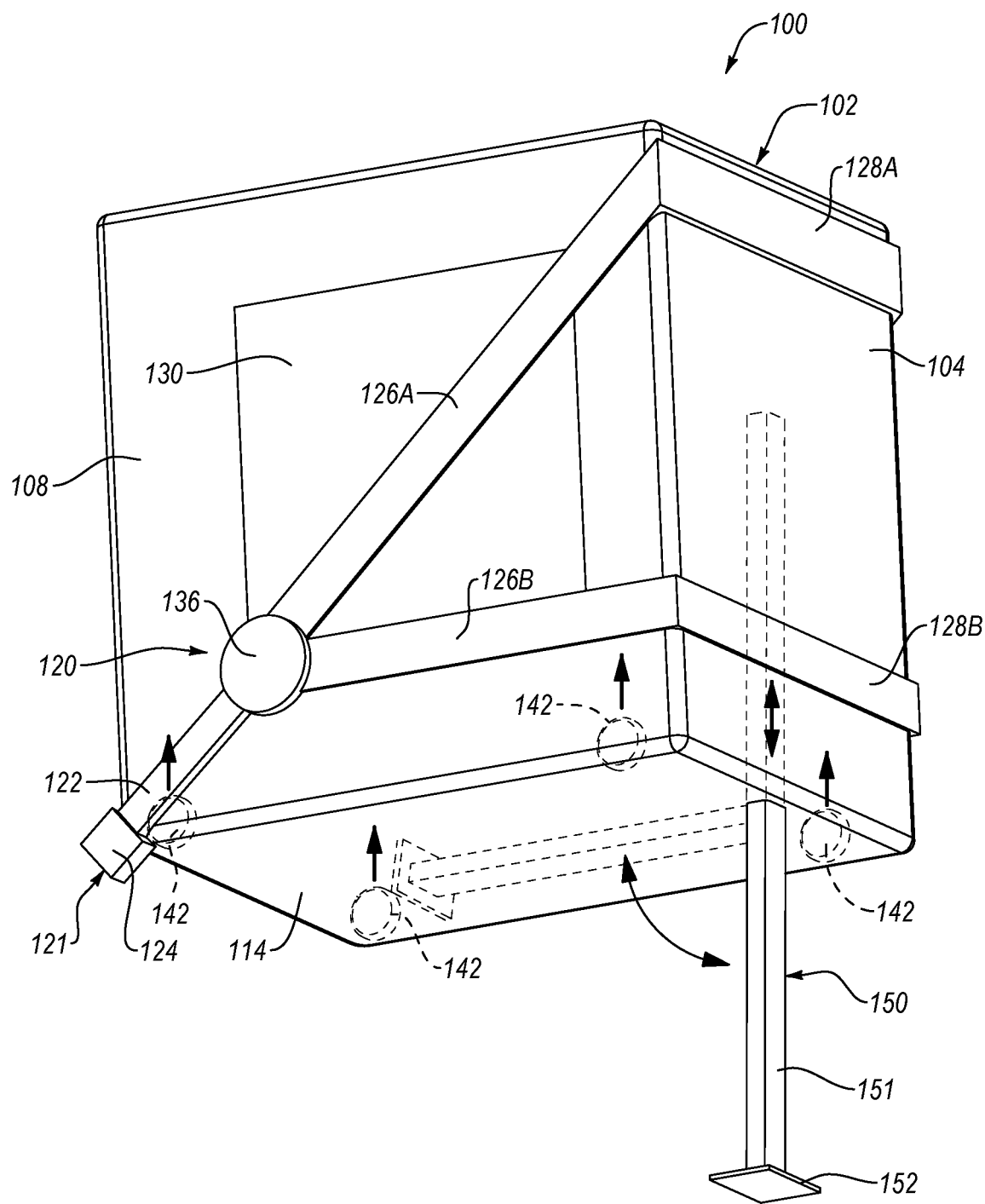
FIG. 4 is a perspective view of a bottom side of the pet carrier of FIG. 1, shown with a retractable stand extended, according to one or more examples of the present disclosure.

Referring to FIG. 4, the pet carrier 100 additionally includes a retractable stand 150 coupled to the housing 102. The retractable stand 150 stand is selectively adjustable to extend from the bottom wall 114 in a direction perpendicular to the bottom wall 114 and away from the top wall 112. The retractable stand 150 includes an elongated base 151. In the illustrated example, a distal end of the base 151 includes a foot 152. The foot 152 defines a contact surface configured to engage a support surface, such as a floor 154 of a vehicle 200. Accordingly, the contact surface of the foot 152 can have an enlarged surface area compared to the base 151. Furthermore, the contact surface of the foot 152 may include friction-inducing materials, surface features, and the like to promote engagement between the contact surface and the corresponding support surface.

The retractable stand 150 can be retractable in various ways. In a first example, the retractable stand 150 can be pivotally coupled to the housing 102, such as at the bottom wall 114 of the housing 102, to allow the retractable stand 150 to pivot relative to the housing 102. Accordingly, in the first example, the retractable stand 150 can be pivoted, as indicated by directional arrows, between an extended position (see, e.g., FIG. 4), where the retractable stand 150 extends from the bottom wall 114 in a direction substantially perpendicular to the bottom wall 114 and away from the top wall 112, and a retracted position, where the retractable stand 150 extends substantially parallel to the bottom wall 114. In the retracted position, in the first example, the retractable stand 150 can be adjacent the bottom wall 114, abutting the bottom wall 114, or be tucked into a channel formed in the bottom wall 114. According to a second example, the retractable stand 150 can be coupled to the housing 102, such as at the bottom wall 114 of the housing 102, to allow the retractable stand 150 to linearly translationally move relative to the housing 102. Accordingly, in the second example, the retractable stand 150 can be linearly translated, as indicated by directional arrows, between the extended position and a retracted position, where the retractable stand 150 extends substantially parallel to the front wall 104 and perpendicular to the bottom wall 114. In the retracted position, in the second example, the retractable stand 150 can be embedded within or be located interiorly of the front wall 104. Various releasable locking engagement features (e.g., detent mechanism, spring-loaded pins, etc.) can be utilized to facilitate releasable locking of the retractable stand 150 in the extended position and the retracted position.

Referring again to FIGS. 1 and 2, the pet carrier 100 further includes the wall reinforcement system 120. As presented above, the pet carrier 100 is configured to be securely retained on a seat of a vehicle (e.g., the vehicle 200 of FIG. 6) while the vehicle is in motion. Accordingly, in some examples, the pet carrier 100 is configured to withstand high inertial forces caused by a pet, situated within the housing 102, impacting the walls of the pet carrier 100 when the vehicle experiences extreme unexpected motion, such as due to an abrupt reduction in speed or a change of direction of the vehicle. The ability to withstand such high inertial forces keeps the pet within the housing 102 during extreme unexpected motion, thus helping to protect other passengers in the vehicle. In some examples, the vehicle 200 is an aircraft, and the wall reinforcement system 120 is configured to help the pet carrier 100 withstand inertial forces of at least three times the force of gravity (e.g., 3.0 g). In particular, according to one example, the wall reinforcement system 120 helps the front wall 104 of the pet carrier 100 to withstand inertial forces of at least nine times the force of gravity (e.g., 9.0 g) and helps each of the first side wall 108 and the second side wall 110 of the pet carrier 100 to withstand inertial forces of at least three times or at least nine times the force of gravity.

In the illustrated example, the wall reinforcement system 120 includes a first front reinforcement strap 128A and a second front reinforcement strap 128B each coupled to and extending across the front wall 104 of the housing 102 of the pet carrier 100. Additionally, the wall reinforcement system 120 includes a first side reinforcement strap 126A and a second side reinforcement strap 126B both coupled to and extending across corresponding ones of the first side wall 108 and the second side wall 110. In other words, the wall reinforcement system 120 includes a first side reinforcement strap 126A and a second side reinforcement strap 126B coupled to and extending across the first side wall 108 and a first side reinforcement strap 126A and a second side reinforcement strap 126B coupled to and extending across the first side wall 108. The first front reinforcement strap 128A and the second front reinforcement strap 128B extend along an exterior side of the front wall 104 and the first side reinforcement strap 126A and the second side reinforcement strap 126B extend along an exterior side of the first side wall 108 in one example.

The first front reinforcement strap 128A is coupled to the first side reinforcement straps 126A and the second front reinforcement strap 128B is coupled to the side reinforcement straps 126B. In one example, the first front reinforcement strap 128A and the first side reinforcement straps 126A together form a single continuous strap such that the first front reinforcement strap 128A is seamlessly coupled to the first side reinforcement straps 126A. Similarly, in one example, the second front reinforcement strap 128B and the second side reinforcement straps 126B together form a single continuous strap such that the second front reinforcement strap 128B is seamlessly coupled to the second side reinforcement straps 126B. However, in other examples, the first front reinforcement strap 128A is a separate strap attached to the first side reinforcement straps 126A and the second front reinforcement strap 128B is a separate strap attached to the side reinforcement straps 126B.

The first front reinforcement strap 128A and the second front reinforcement strap 128B are spaced apart from each other, in a direction perpendicular to the top wall 112 and the bottom wall 114, on the front wall 104. Accordingly, the first front reinforcement strap 128A can be considered an upper front reinforcement strap and the second front reinforcement strap 128B can be considered a lower front reinforcement strap. In a particular example, the first front reinforcement strap 128A is spaced an equal distance away from the top wall 112 and the second front reinforcement strap 128B, and the second front reinforcement strap 128B is spaced an equal distance away from the bottom wall 114 and the first front reinforcement strap 128A. In the illustrated example, the first front reinforcement strap 128A and the second front reinforcement strap 128B extend parallel to the top wall 114, the bottom wall 114, and each other.

According to one example, the first front reinforcement strap 128A and the second front reinforcement strap 128B are non-removably coupled to the exterior side of the front wall 104. In some implementations, the first front reinforcement strap 128A and the second front reinforcement strap 128B are adhered, stitched, sewn, or otherwise permanently attached to the exterior side of the front wall 104.

In another example, the first front reinforcement strap 128A and the second front reinforcement strap 128B are removably coupled to the exterior side of the front wall 104. In one implementation, the first front reinforcement strap 128A and the second front reinforcement strap 128B are releasably attached, such as via a hook-and-loop attachment mechanism, to the exterior side of the front wall 104. Alternatively, or additionally, according to one implementation shown in FIG. 12, the front wall 104 may include loops 190 or pockets integrated into the front wall 104 to receive and retain a corresponding one of the first front reinforcement strap 128A and the second front reinforcement strap 128B.

Referring to FIG. 1, the first side reinforcement strap 126A and the second side reinforcement strap 126B are spaced apart from each other, in a direction perpendicular to the top wall 112 and the bottom wall 114, on the first side wall 108. Accordingly, the first side reinforcement strap 126A can be considered an upper side reinforcement strap and the second side reinforcement strap 126B can be considered a lower side reinforcement strap. In a particular example, as shown, the second side reinforcement strap 126B extends parallel to bottom wall 114 and the first side reinforcement strap 126A extends diagonally relative to the bottom wall 114. The first side reinforcement strap 126A extends diagonally from a location near the back wall 106 and the bottom wall 114 to a location near the front wall 104 and the top wall 112.

According to one example, the first side reinforcement strap 126A and the second side reinforcement strap 126B are removably coupled to the exterior side of the first side wall 108. In some implementations, the first front reinforcement strap 128A and the second front reinforcement strap 128B merely overlay the exterior side of the front wall 104, including the door 130. Accordingly, referring to FIG. 3, the first side reinforcement strap 126A and the second side reinforcement strap 126B can be moved away from the first side wall 108 to access the door 132.

The first side reinforcement strap 126A and the second side reinforcement strap 126B can converge at and be coupled to a hub 136. The hub 136 may include one or more loops, rings, hooks, slits, or brackets to which the first side reinforcement strap 126A and the second side reinforcement strap 126B can be secured. Alternatively, the hub 136 may include overlapping portions of the first side reinforcement strap 126A and the second side reinforcement strap 126B that are stitched or patched together. In one example, the hub 136 is selectively removably coupled to the first side wall 108 to indirectly selectively removably couple the first side reinforcement strap 126A and the second side reinforcement strap 126B to the first side wall 108.

Referring to FIG. 2, the first side reinforcement strap 126A and the second side reinforcement strap 126B on the second side wall 110 can be mirrored duplicates of the first side reinforcement strap 126A and the second side reinforcement strap 126B on the first side wall 108. Accordingly, the above-presented description of the first side reinforcement strap 126A and the second side reinforcement strap 126B on the first side wall 108 is equally applicable to the first side reinforcement strap 126A and the second side reinforcement strap 126B on the second side wall 110.

Although the illustrated embodiment of the pet carrier 100 includes two side reinforcement straps on each of the first side wall 108 and the second side wall 110 of the housing 102 and two front reinforcement straps on the front wall 104 of the housing 102, in other embodiments, the wall reinforcement system 120 includes only one side reinforcement strap and one front reinforcement strap or more than two side reinforcement straps and more than two front reinforcement straps. For example, referring to FIG. 10, the first front reinforcement strap 128A and the second front reinforcement strap 128B can be coupled to a collection of interconnected front reinforcement straps 180 arranged in a desired pattern. The collection of interconnected front reinforcement straps 180 in the illustrated example are arranged in a rectangular pattern. However, in other examples, the collection of interconnected front reinforcement straps 180 can be arranged in any of various other patterns to provide a desired reinforcement of the front wall 104. As an example, referring to FIG. 11, the wall reinforcement system 120 includes a plurality of front reinforcement straps interconnected together to form a netting 182 or open mesh.

The seat belt extenders 121 of the pet carrier 100 are configured to releasably engage the side reinforcement straps of the wall reinforcement system 120 to corresponding portions of the seat belt 204 of a seat or multiple seats of a vehicle. Referring to FIG. 1, the seat belt extender 121 corresponding with the first side wall 108 includes an extension strap 122 and a mechanical coupler 124 coupled to the extension strap 122. The extension strap 122 is coupled to the first side reinforcement strap 126A and the second side reinforcement strap 126B on the first side wall 108. In one example, as shown, the extension strap 122 is coupled to the first side reinforcement strap 126A and the second side reinforcement strap 126B via the hub 136. For example, the extension strap 122 can be attached to the hub 136, such as to one or more hooks, slits, brackets, or the like of the hub 136. Alternatively, the hub 136 may include overlapping portions of the first side reinforcement strap 126A, the second side reinforcement strap 126B, and the extension strap 122 that are stitched or patched together.

Figure 6:
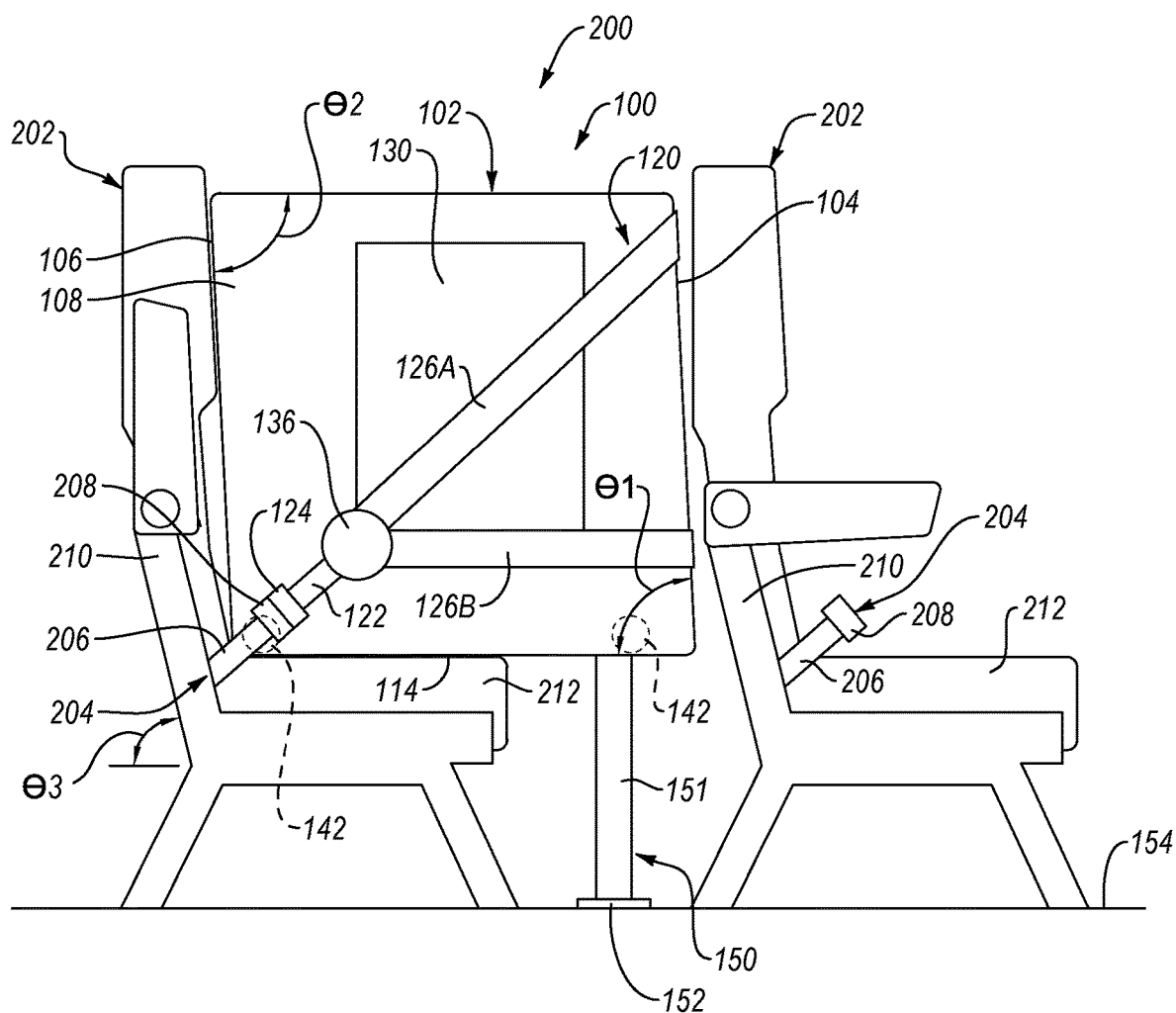
FIG. 6 is a side elevation view of a vehicle, according to one or more examples of the present disclosure.

The mechanical coupler 124 is one of a first type or a second type of seat belt connector, such as a tongue or a buckle. The first type of seat belt connector (e.g., a tongue) is configured to releasably engage the second type of seat belt connector (e.g., a buckle). Referring to FIG. 6, the seat belt 204 of the vehicle 200 includes two sets of a seat belt strap 206 and a seat belt connector 208 that is coupled to the seat belt strap 206. The seat belt connector 208 of a first set of the seat belt 204 is of the first type and the seat belt connector 208 of a second set of the seat belt 204 is of the second type where, as just presented, the first type is releasably engageable with the second type. In this manner, the seat belt connector 208 of the first set of the seat belt 204 can be releasably engaged with the seat belt connector 208 of the second set of the seat belt 204 to releasably secure the first set to the second set and thereby releasably secure an occupant to a seat 202 of the vehicle 200. In a similar manner, the first type of seat belt connector of the mechanical coupler 124 can releasably engage the second type of seat belt connector of the seat belt 204 and the second type of seat belt connector of the mechanical coupler 124 can releasably engage the first type of seat belt connector of the seat belt 204.

Referring to FIG. 2, the seat belt extender 121 on the second side wall 110 can be mirrored duplicates of the seat belt extender 121 on the first side wall 108. Accordingly, the above-presented description of the seat belt extender 121 on the first side wall 108 is equally applicable to the seat belt extender 121 on the second side wall 110.

All, some, or at least one of the straps of the first side reinforcement strap 126A, the second side reinforcement strap 126B, the first front reinforcement strap 128A, the second front reinforcement strap 128B, the extension straps 122, and the seat belt straps 206 can be a webbing of synthetic or natural fibers. For example, one or more of the first side reinforcement strap 126A, the second side reinforcement strap 126B, the first front reinforcement strap 128A, the second front reinforcement strap 128B, the extension straps 122, and the seat belt straps 206 can be a nylon or polyester webbing. The webbing is a relatively strong, closely woven fabric. In one example, all, some, or at least one of the straps of the first side reinforcement strap 126A, the second side reinforcement strap 126B, the first front reinforcement strap 128A, the second front reinforcement strap 128B, the extension straps 122, and the seat belt straps 206 is a flat strap that is elongated. Alternatively, in another example, all, some, or at least one of the straps of the first side reinforcement strap 126A, the second side reinforcement strap 126B, the first front reinforcement strap 128A, the second front reinforcement strap 128B, the extension straps 122, and the seat belt straps 206 is a tubular strap that is elongated.

Figure 14:
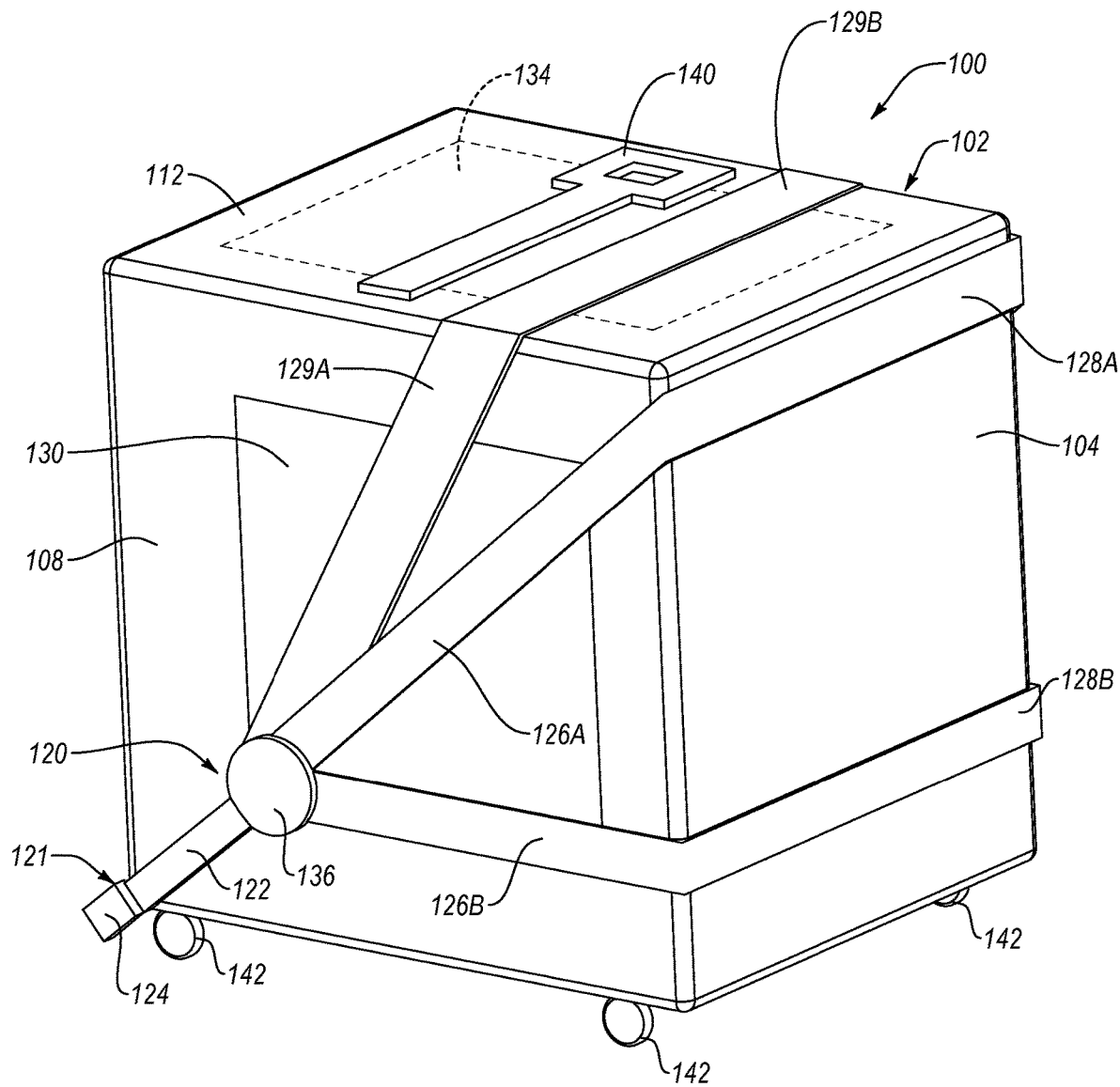
FIG. 14 is a perspective view of a first side of a pet carrier, according to one or more examples of the present disclosure.

Referring to FIG. 14, in one example, the wall reinforcement system 120 further includes a third side reinforcement strap 129A, on each of the first side wall 108 and the second side wall 110, and a top reinforcement strap 129B on the top wall 112. The third side reinforcement strap 129A is coupled to the hub 136 on a corresponding one of the first side wall 108 and the second side wall 110. The top reinforcement strap 129B is coupled to the third side reinforcement straps 129A and extends across the top wall 112. The third side reinforcement straps 129A are configured similarly to the first side reinforcement straps 126A and the second side reinforcement straps 128A. Likewise, the top reinforcement strap 129B is configured similarly to the first front reinforcement strap 128A and the second front reinforcement strap 128B. For example, the top reinforcement strap 129B can be permanently attached to the top wall 112 or can non-permanently overlay the top wall 112. According to one example, the top reinforcement strap 129B helps the top wall 112 of the pet carrier 100 to withstand inertial forces of at least three times the force of gravity. In some examples, the top reinforcement strap 129B is non-movably fixed (e.g., sewn) to the top wall 112 and thus the top wall 112 does not include a door 134. The handle 140 can be to the side of the top reinforcement strap 129B or can be positioned on top of or over the top reinforcement strap 129B.

Referring to FIG. 6, one example of the vehicle 200 is shown. The vehicle 200 can be any of various types of vehicles, such as aircraft, helicopters, boats, spacecraft, automobiles, and the like. The vehicle 200 includes at least two seats 202 in tandem, such that a space is defined between the at least two seats 202. In some examples, the vehicle 200 also includes at least one seat 202 to at least one side of the seats 202. Moreover, in some vehicles, such as mass-transit vehicles, the seats 202 of the vehicle 200 may be arranged such that an aisle or gap is defined between laterally adjacent rows of seats 202. For many vehicles 200, the aisle between rows of seats 202 is narrower than a width of each seat 202. The vehicle 200 includes a floor 154 upon which the seats 202 are supported. Each seat 202 includes a seat back 210, a seat bottom 212, and a seat belt 204. A third angle θ3 is defined between the seat back 210 and the floor 154. The third angle θ3 is an acute angle in some examples. The third angle θ3 is equal to one or both of the first angle θ1 and the second angle θ2 of the housing 102 of the pet carrier 100.

The pet carrier 100 is configured to be stored or to transport a pet to, away, or on the vehicle 200. In one example, the pet carrier 100 is operable in at least one, some, or all of a storage mode, a pet transport mode, an aisle traversal mode, and a pet stowage mode.

In the storage mode, the housing 102 of the pet carrier 100 is at least partially collapsed to reduce the volume of space occupied by the housing 102 in order to promote storage of the pet carrier 100 when not in use. In one example, the housing 102 is fully collapsed when in the storage mode. In addition to the housing being at least partially collapsed, the retractable wheels 142 can be retraced and the retractable stand 150 can be retracted to promote storage of the pet carrier 100 when not in use. The handle 140 may also be retracted when the pet carrier 100 is in the storage mode.

When used to transport a pet to and from the vehicle 200, the pet carrier 100 is operated in the pet transport mode. As shown in FIG. 2, in the pet transport mode, the housing 102 of the pet carrier 100 is fully expanded, but could be partially expanded in some examples, such as if a smaller pet is being transported. In the pet transport mode, the retractable wheels 142 are extended and the retractable stand 150 is retracted. Additionally, the handle 140 can be extended in the pet transport mode. With the retractable wheels 142 extended, the pet carrier 100 is able to be rolled along the ground to and from the vehicle 200 easier than manually carrying the pet carrier 100 off the ground. The handle 140 helps facilitate pulling of the pet carrier 100 along the ground.

If the aisle of the vehicle 200 is too narrow for the pet carrier 100 to traverse when in the pet transport mode, the pet carrier 100 can be operated in the aisle traversal mode. As shown in FIG. 9, in the aisle traversal mode, the pet carrier 100 has a smaller width than in the pet transport mode. The width can be reduced by partially collapsing the pet carrier 100 in the widthwise direction as presented above. Furthermore, in the aisle traversal mode, the retractable wheels 142 are extended and the retractable stand 150 is retracted. The handle 140 can also be extended in the aisle traversal mode to help move (e.g., pull) the pet carrier 100 along the floor 154 of the vehicle 200.

When ready to stow the pet carrier 100 on one or more seats 202 of the vehicle 200, the pet carrier 100 can be operated in the pet stowage mode. As shown in FIG. 4, in the pet stowage mode, the pet carrier 100 has a width greater than in the aisle traversal mode. The width can be increased by partially expanding the pet carrier 100 in the widthwise direction as presented above. In the pet stowage mode, the retractable wheels 142 are retracted and the retractable stand 150 is extended such that when the housing 102 is supported on the seat bottom 212, the retractable stand 150 is supported on the floor 154 of the vehicle 200. With the retractable stand 150 supported on the floor 154, the pet carrier 100 is able to better withstand overturning forces acting on the pet carrier 100. In contrast, in some examples, such as shown in FIG. 14, the pet carrier 100 does not include a retractable stand 150. Rather, the pet carrier 100 shown in FIG. 14 utilizes the top reinforcement strap 129B, and its secure connection to the seat belt 204 of a seat 202, to help withstand overturning forces acting on the pet carrier 100. Accordingly, the top reinforcement strap 129B can help obviate the need for a retractable stand 150 in one example or supplement the use of a retractable stand 150 in another example.

Figure 13:
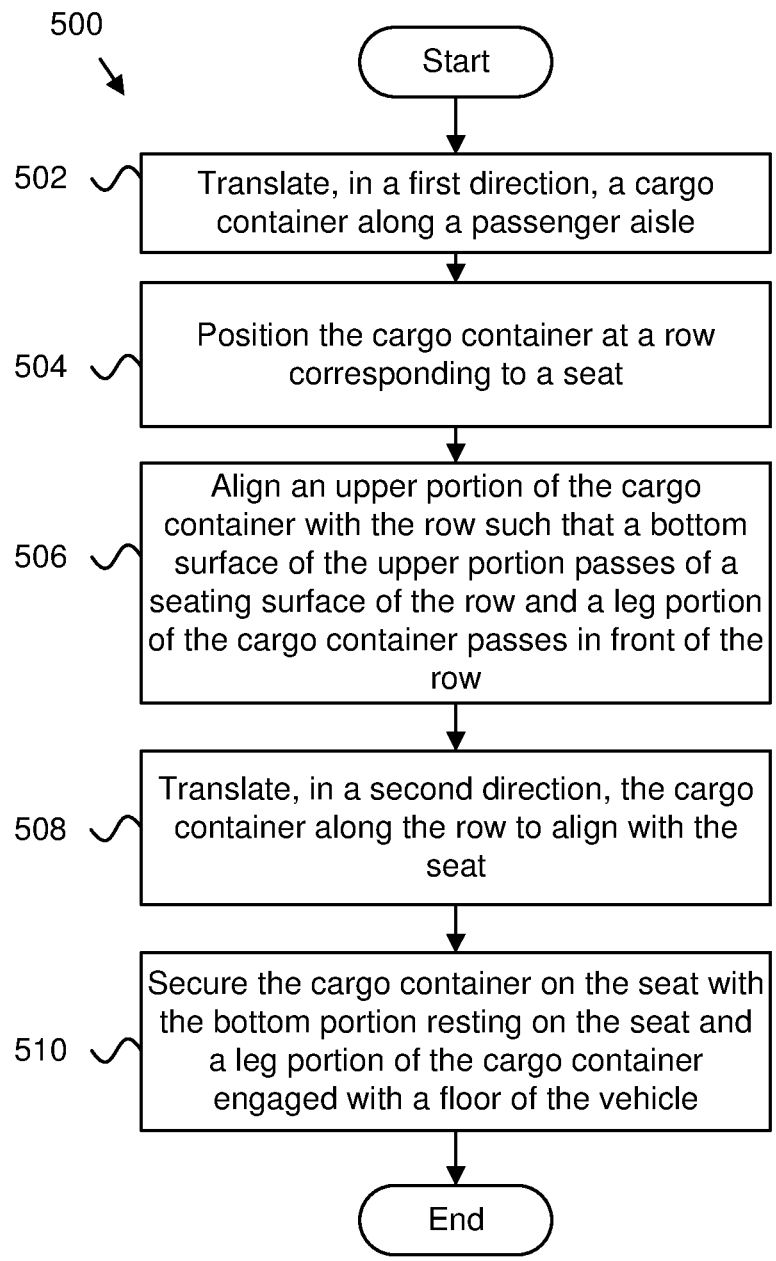
FIG. 13 is a schematic flow diagram of a method of transporting a pet carrier, according to one or more examples of the present disclosure.

According to one embodiment shown in FIG. 13, a method 300 of transporting a pet carrier 100 is shown. Although optional, the pet carrier 100 may be in a storage mode when not in use. When use of the pet carrier 100 is subsequently desired, the method 300 includes converting the pet carrier 100 from the storage mode to the pet transport mode at 302. Converting the pet carrier 100 from the storage mode to the pet transport mode at 302 includes expanding the housing 102 to a fully or partially expanded state, extending the retractable wheels 142, and extending the handle 140. After the housing 102 is fully or partially expanded, one or more pets can be placed within the interior cavity 160 of the housing 102 via one or more doors in the housing 102. With the pet in the pet carrier 100, the pet carrier 100 can be transported in the pet transport mode to the vehicle 200, such as to an airport, through the airport, and onto an aircraft.

Before traversing the aisle of the vehicle 200, and if the aisle is narrower than the width of the pet carrier 100, the method 300 includes converting the pet carrier 100 from the pet transport mode to the aisle traversal mode at 304. The pet carrier 100 can be converted from the pet transport mode to an aisle traversal mode by decreasing the width of the pet carrier 100. The pet can still be housed within the interior cavity 160 of the housing 102 as the width of the housing 102 is decreased. Alternatively, the pet can be removed from the housing before converting into the aisle traversal mode. The width of the housing 102 is decreased until the width is less than and passable through the aisle. The pet carrier 100 can then be rolled along the aisle until an assigned seat of the vehicle 200 is reached. In other examples, the pet carrier 100 is completely collapsed into the aisle traversal mode with the pet outside of the pet carrier 100.

When the assigned seat of the vehicle 200 is reached, the method 300 includes converting the pet carrier 100 from the aisle traversal mode to the pet stowage mode at 306. Converting the pet carrier 100 from the aisle traversal mode to the pet stowage mode can include retracting the retractable wheels 142, retracting the handle 140, expanding the width of the pet carrier 100, such as back to the width of the pet carrier 100 when in the pet transport mode, and expanding the retractable stand 150. In implementations without the retractable stand 150, such as the pet carrier 100 shown in FIG. 14, converting the pet carrier 100 to the pet stowage mode does not include expanding the retractable stand 150. In the pet stowage mode, the housing 102 of the pet carrier 100 can be placed on the seat bottom 212 of one or more of the seats 202 with the retractable stand 150 supported on the floor 145. Additionally, the mechanical coupler 124 of one of the seat belt extenders 121 can be releasably secured to one of the seat belt connectors 208 of the seat 202 and the mechanical coupler 124 of the other one of the seat belt extenders 121 can be releasably secured to the other one of the seat belt connectors 208 of the seat 202. In this manner, the pet carrier 100 is secured to the seat 202. In some examples where the pet is removed from the pet carrier 100 during the aisle traversal mode, the pet can be put back into the pet carrier 100 after the pet carrier 100 is converted into the pet stowage mode.

After transportation on the vehicle 200, the pet carrier 100 can be converted between modes in a reverse manner to remove the pet carrier 100 from the seat 202, to transport the pet carrier 100 along the aisle, to transport the pet carrier 100 away from the vehicle 200, and to store the pet carrier 100.

According to another method of transporting a pet carrier 100, the aisle traversal mode includes removing the pet from the pet carrier 100 and fully collapsing the pet carrier 100. Then, when the assigned seat of the vehicle 200 is reached, the pet carrier 100 is fully expanded, placed on the assigned seat(s), and the pet is reintroduced into the pet carrier 100.

Figure 15:
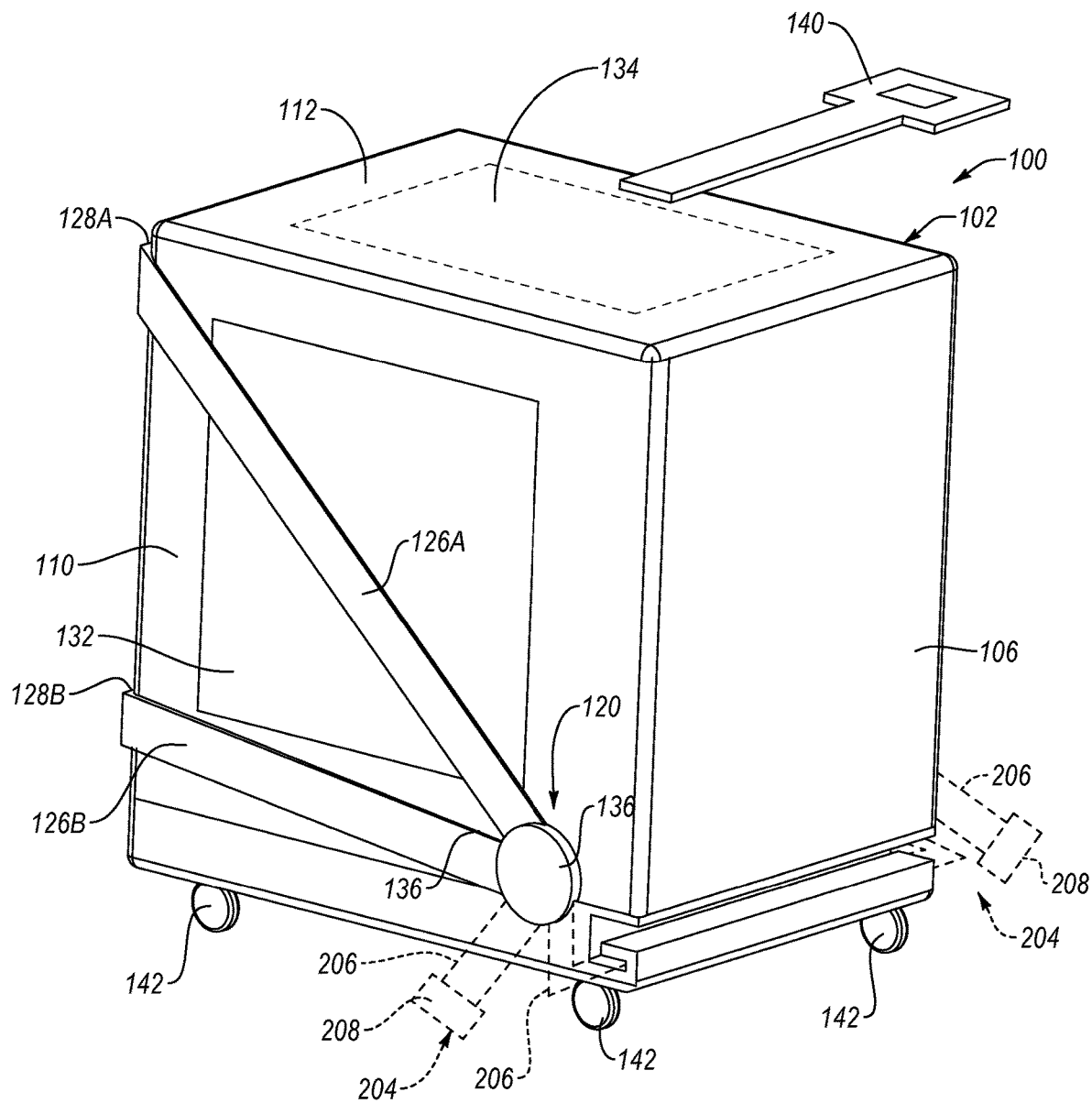
FIG. 15 is a perspective view of a second side of a pet carrier, according to one or more examples of the present disclosure.

Referring to FIG. 15, according to an alternative embodiment, the pet carrier 100 is configured to be secured to the seat belt 204 of the vehicle 200 without the seat belt extenders 121. For example, the housing 102 of the pet carrier 100 includes a rigid base 192 in place of the bottom wall 114. The rigid base 192 includes a seat belt retention slot 194 formed in a back side of the rigid base 192. The seat belt retention slot 194 is configured to releasably receive and retain the seat belt strap(s) 206 of the seat belt 204 of the vehicle 200. In other words, the seat belt strap(s) 206 can be inserted into the seat belt retention slot 194 when used to secure the pet carrier 100 to a seat 202 and can be removed from the seat belt retention slot 194 following use. In the illustrated example, the seat belt retention slot 194 is a circumferentially open slot that includes a channel that is rearwardly closed and an adjacent channel that is rearwardly open. The seat belt strap(s) 206 can be passed through the rearwardly open channel and into the rearwardly closed channel. When engaged with the seat belt retention slot 194 of the pet carrier 100, the seat belt strap(s) 206 are coupled together by releasably engaging the opposing seat belt connectors 208 of the seat belt 204 and tightening the seat belt straps 206. Because the rearwardly closed channel is closed in the rearward directly, the seat belt strap(s) 206, when tightened, is constrained from disengaging from the rearwardly closed channel, thus securely retaining the pet carrier 100 on the seat 202. The seat belt retention slot 194 can be a circumferentially closed slot, which allows the seat belt strap(s) 206 to be threaded through the seat belt retention slot 194 to engage the seat belt strap 206 with the seat belt retention slot 194.

Prior to releasably engaging the seat belt straps 206 of the seat belt 204, each seat belt strap 206 is coupled to a corresponding one of the hubs 136, which intercouples the seat belt straps 206 and the reinforcement straps of the wall reinforcement system 120. In one example, the hubs 136 are rings and coupling the seat belt straps 206 to the hubs 136 includes threading each seat belt strap 206 through a corresponding one of the rings.

It is recognized that, in some examples, the pet carrier 100 of FIG. 15 can include a seat belt extender, similar to the seat belt extenders 121. The seat belt extender can pass through the hub 136 on one side of the pet carrier 100, through the seat belt retention slot 194, and through the hub 136 on the opposite side of the pet carrier 100. Then, a corresponding one of the two seat belt straps 206 can be releasably engaged to a corresponding one of opposing mechanical couplers of the seat belt extender to secure the pet carrier 100 to the seat(s).

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A pet carrier for transporting a pet in a vehicle, comprising:
   a housing comprising a back wall, a front wall opposite the back wall, a first side wall, a second side wall opposite the first side wall, a top wall, a bottom wall opposite the top wall, and a door formed in at least one of the first side wall and the second side wall, wherein at least one dimension of the housing is adjustable; and
   a wall reinforcement system comprising:
      at least one front reinforcement strap coupled to and extending across the front wall; and
      side reinforcement straps each coupled to and extending across corresponding ones of the first side wall and the second side wall, wherein the at least one front reinforcement strap is coupled to the side reinforcement straps.

2. The pet carrier according to claim 1, further comprising seat belt extenders each comprising:
   an extension strap coupled to a corresponding one of the side reinforcement straps; and
   a mechanical coupler coupled to the extension strap, wherein the mechanical coupler is configured to be releasably coupled to a seat belt of the vehicle.

3. The pet carrier according to claim 2, wherein the wall reinforcement system comprises:

two front reinforcement straps coupled to and extending across the front wall, wherein the two front reinforcement straps are spaced apart from each other; and two side reinforcement straps both coupled to and extending across corresponding ones of the first side wall and the second side wall, wherein the two side reinforcement straps corresponding with each of the first side wall and the second side wall are spaced apart from each other;

wherein each of the two side reinforcement straps corresponding with each of the first side wall and the second side wall is coupled to a corresponding one of the two front reinforcement straps; and wherein the extension strap of each seat belt extender is coupled to the two side reinforcement straps corresponding with a respective one of the first side wall and the second side wall.

4. The pet carrier according to claim 2, wherein the at least one front reinforcement strap, the side reinforcement straps, and the extension strap of each one of the seat belt extenders comprises webbing made of synthetic or natural fibers.

5. The pet carrier according to claim 4, wherein the plurality of front reinforcement straps form a netting.

6. The pet carrier according to claim 1, wherein the wall reinforcement system comprises a plurality of front reinforcement straps interconnected together at the front wall.

7. The pet carrier according to claim 1, wherein the at least one front reinforcement strap is seamlessly coupled to the side reinforcement straps.

8. The pet carrier according to claim 1, wherein at least one of:
an angle defined between the front wall and the bottom wall is acute; and
an angle defined between the back wall and the top wall is acute.

9. The pet carrier according to claim 8, wherein both the angle defined between the front wall and the bottom wall is acute and the angle defined between the back wall and the top wall is acute.

10. The pet carrier according to claim 1, wherein a cross-sectional shape of the housing, defined along a plane perpendicular to the back wall and the front wall is a non-rectangular parallelogram.

11. The pet carrier according to claim 1, wherein each of the back wall, the front wall, the first side wall, the second side wall, and the top wall comprises a flexible fabric.

12. The pet carrier according to claim 11, wherein the bottom wall comprises a rigid shell.

13. The pet carrier according to claim 1, further comprising retractable wheels coupled to the bottom wall.

14. The pet carrier according to claim 1, further comprising a retractable stand coupled to the housing, wherein the retractable stand is selectively adjustable to extend from the bottom wall in a direction perpendicular to the bottom wall and away from the top wall.

15. The pet carrier according to claim 14, wherein the housing further comprises at least one telescoping feature selectively operable to adjust the distance between the front wall and the back wall.

16. The pet carrier according to claim 14, wherein the at least one dimension of the housing further comprises a distance between the top wall and the bottom wall.

17. The pet carrier according to claim 1, wherein the at least one dimension of the housing comprises a distance between the front wall and the back wall.

18. The pet carrier according to claim 1, wherein the wall reinforcement system further comprises at least one top reinforcement strap coupled to and extending across the top wall.

19. The pet carrier according to claim 1, wherein:
the housing further comprises a seat belt retention slot configured to releasably retain at least one of two seat belt straps of a seat belt of the vehicle; and
the pet carrier further comprises hubs each coupled to a corresponding one of the side reinforcement straps and each configured to be releasably coupled to a corresponding one of the two seat belt straps.

20. A pet carrier for transporting a pet in a vehicle, the vehicle comprising at least two seats in tandem, such that a space is defined between the at least two seats, and a floor on which the at least two seats are supported, wherein each seat comprises a seat back, a seat bottom, and a seat belt and wherein an acute angle is defined between the seat back and the floor, the pet carrier comprising:
a housing comprising a back wall, a front wall opposite the back wall, a first side wall, a second side wall opposite the first side wall, a top wall, and a bottom wall opposite the top wall, wherein:
an angle defined between the front wall and the bottom wall is equal to the acute angle defined between the seat back and the floor; and
an angle defined between the back wall and the top wall is equal to the acute angle defined between the seat back and the floor;
a wall reinforcement system comprising:
at least one front reinforcement strap coupled to and extending across the front wall; and
side reinforcement straps each coupled to and extending across corresponding ones of the first side wall and the second side wall, wherein the at least one front reinforcement strap is coupled to the side reinforcement straps; and
seat belt extenders each comprising:
an extension strap coupled to a corresponding one of the side reinforcement straps; and
a mechanical coupler coupled to the extension strap, wherein the mechanical coupler is configured to be releasably coupled to the seat belt of a corresponding one of the seats of the vehicle.

21. The pet carrier according to claim 20, further comprising a retractable stand coupled to the housing, wherein the retractable stand is selectively adjustable to extend from the bottom wall in a direction perpendicular to the bottom wall and away from the top wall, wherein:
the housing is positionable within the space defined between the at least two seats and supportable on the seat bottom of a rearward one of the at least two seats; and
when the housing is supported on the seat bottom, the retractable stand, when extended, is supported on the floor of the vehicle.

22. The pet carrier according to claim 20, wherein:
the front wall comprises a flexible fabric; and
the front wall and the at least one front reinforcement strap together withstand inertial forces of at least nine times the force of gravity.

23. A pet carrier for transporting a pet in a vehicle, the pet carrier comprising:
a housing;
a retractable stand coupled to the housing; and
retractable wheels coupled to the housing;

wherein the pet carrier is operable in:
- a storage mode in which the housing of the pet carrier is at least partially collapsed, the retractable wheels of the pet carrier are retracted, and the retractable stand of the pet carrier is retracted;
- a pet transport mode in which the housing of the pet carrier is fully expanded, the retractable wheels of the pet carrier are extended, and the retractable stand of the pet carrier is retracted;
- an aisle traversal mode in which the pet carrier has a smaller width than in the pet transport mode, the retractable wheels of the pet carrier are extended, and the retractable stand of the pet carrier is retracted; and
- a pet stowage mode in which the pet carrier has a width greater than in the aisle traversal mode, the retractable wheels of the pet carrier are retracted, and the retractable stand of the pet carrier is extended.

24. A method of transporting a pet carrier, wherein the method comprises:
- converting the pet carrier from a storage mode, in which a housing of the pet carrier is at least partially collapsed and a retractable stand of the pet carrier is retracted, to a pet transport mode, in which the housing of the pet carrier is fully expanded, retractable wheels of the pet carrier are extended, and the retractable stand of the pet carrier is retracted;
- converting the pet carrier from the pet transport mode to an aisle traversal mode, in which the pet carrier has a smaller width than in the pet transport mode, the retractable wheels of the pet carrier are extended, and the retractable stand of the pet carrier is retracted; and
- converting the pet carrier from the aisle traversal mode to a pet stowage mode, in which the pet carrier has a width greater than in the aisle traversal mode, the retractable wheels of the pet carrier are retracted, and the retractable stand of the pet carrier is extended.

* * * * *